(12) United States Patent
Xia et al.

(10) Patent No.: US 11,595,246 B2
(45) Date of Patent: Feb. 28, 2023

(54) MBMS SESSION RESTORATION IN EPS FOR PATH FAILURE

(71) Applicant: Telefonaktiebolaget LM Ericsson (publ), Stockholm (SE)

(72) Inventors: Qi Xia, Shanghai (CN); Yong Yang, Kållered (SE); Dongmei Zhu, Shanghai (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/221,149

(22) Filed: Dec. 14, 2018

(65) Prior Publication Data

US 2019/0123957 A1    Apr. 25, 2019

Related U.S. Application Data

(63) Continuation of application No. 14/785,202, filed as application No. PCT/EP2014/057722 on Apr. 16, 2014, now Pat. No. 10,193,743.

(60) Provisional application No. 61/818,602, filed on May 2, 2013, provisional application No. 61/812,280, filed on Apr. 16, 2013.

(51) Int. Cl.
| | |
|---|---|
| H04W 72/00 | (2009.01) |
| H04L 41/0668 | (2022.01) |
| H04W 76/19 | (2018.01) |
| H04W 76/40 | (2018.01) |
| H04L 41/0659 | (2022.01) |
| H04L 45/28 | (2022.01) |
| H04W 76/18 | (2018.01) |
| H04W 76/38 | (2018.01) |

(52) U.S. Cl.
CPC ...... *H04L 41/0668* (2013.01); *H04L 41/0659* (2013.01); *H04L 45/28* (2013.01); *H04W 76/19* (2018.02); *H04W 76/40* (2018.02); *H04W 76/18* (2018.02); *H04W 76/38* (2018.02)

(58) Field of Classification Search
None
See application file for complete search history.

(56) References Cited

U.S. PATENT DOCUMENTS

| | | | | |
|---|---|---|---|---|
| 8,451,746 | B2 * | 5/2013 | Paclik | H04L 43/50 370/468 |
| 8,842,597 | B2 * | 9/2014 | Jiao | H04W 72/005 370/338 |
| 9,497,731 | B2 * | 11/2016 | Shindo | H04W 72/005 |
| 9,516,477 | B2 * | 12/2016 | Jamadagni | H04W 4/06 |
| 9,622,049 | B2 * | 4/2017 | Vetter | H04L 69/167 |
| 9,693,372 | B2 * | 6/2017 | Wang | H04W 72/005 |

(Continued)

FOREIGN PATENT DOCUMENTS

| | | |
|---|---|---|
| WO | 2005008975 A1 | 1/2005 |
| WO | 2008/143559 A1 | 11/2008 |

OTHER PUBLICATIONS

3GPP TS 23.007 V12.0.0 (Year: 2013).*

(Continued)

*Primary Examiner* — Sithu Ko
(74) *Attorney, Agent, or Firm* — Rothwell, Figg, Ernst & Manbeck, P.C.

(57) ABSTRACT

Restoration procedures in a Multimedia Broadcast Multicast Service (MBMS) network (also referred to as evolved MBMS (eMBMS) network) in case of a path failure.

18 Claims, 14 Drawing Sheets

(56) References Cited

U.S. PATENT DOCUMENTS

| | | | |
|---|---|---|---|
| 10,225,854 B2* | 3/2019 | Linden | H04W 72/1263 |
| 2005/0018599 A1* | 1/2005 | Mahasoom | H04L 45/28 |
| | | | 370/216 |
| 2007/0213081 A1 | 9/2007 | Zhang | |
| 2013/0279395 A1* | 10/2013 | Aramoto | H04W 76/32 |
| | | | 370/312 |

OTHER PUBLICATIONS

"3rd Generation Partnership Project; Technical Specification Group Core Network and Terminals; Restoration procedures (Release 12)" 3GPP TS 23.007 V12.0.0 (Mar. 2013), 72 pages.

Alcatel-Lucent, "MBMS Recovery mechanism CT4 WI—Overview of RAN3 impacts", 3GPP TSG-RAN WG3 Meeting #79bis, R3-130649, Apr. 2013, 3 pages.

Alcatel-Lucent, "MCE Takeover Mechanism", 3GPP TSG-RAN3 Meeting #79bis, R3-130651, Apr. 2013, 9 pages.

Nokia Siemens Networks, "Response to R3-130649", 3GPP TSG RAN WG3 #79bis meeting, R3-130729, Apr. 2013, 3 pages.

"3rd Generation Partnership Project; Technical Specification Group Services and System Aspects; Multimedia Broadcast/Multicast Service (MBMS); Architecture and functional description (Release 11)", 3GPP TS 23.246 V11.1.0, Mar. 2012, 66 pages.

"3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)", 3GPP TS 29.274 V12.0.0, Mar. 2013, 228 pages.

"3rd Generation Partnership Project; Technical Specification Group Core Network and Terminals; General Packet Radio Service (GPRS); GPRS Tunnelling Protocol (GTP) across the Gn and Gp interface (Release 12)" 3GPP TS 29.060 V12.0.0, Mar. 2013, 176 pages.

"EMBMS restoration procedures", 3GPP TSG CT WG4 Meeting #60, C4-130247, Jan. 2013, 5 pages.

International Search Report and Written Opinion issued in corresponding International Application No. PCT/EP2014/057722, dated Oct. 22, 2014, 18 pages.

"3rd Generation Partnership Project; Technical Specification Group Radio Access Network; Evolved Universal Terrestrial Radio Access Network (E-UTRAN); M3 Application Protocol (M3AP) (Release 11)" 3GPP TS 36.444 V11.4.0 (Dec. 2012), 63 pages.

"3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)" 3GPP TS 29.274 V11.5.0, Dec. 2012, 227 pages.

"3rd Generation Partnership Project; Technical Specification Group Core Network and Terminals; Restoration procedures (Release 11)," 3GPP TS 23.007 V11.4.0, Dec. 2012, 70 pages.

Office Action dated Oct. 30, 2019, in India Application No. 3674/KOLNP/2015 (6 pages), including English-language translation thereof.

\* cited by examiner

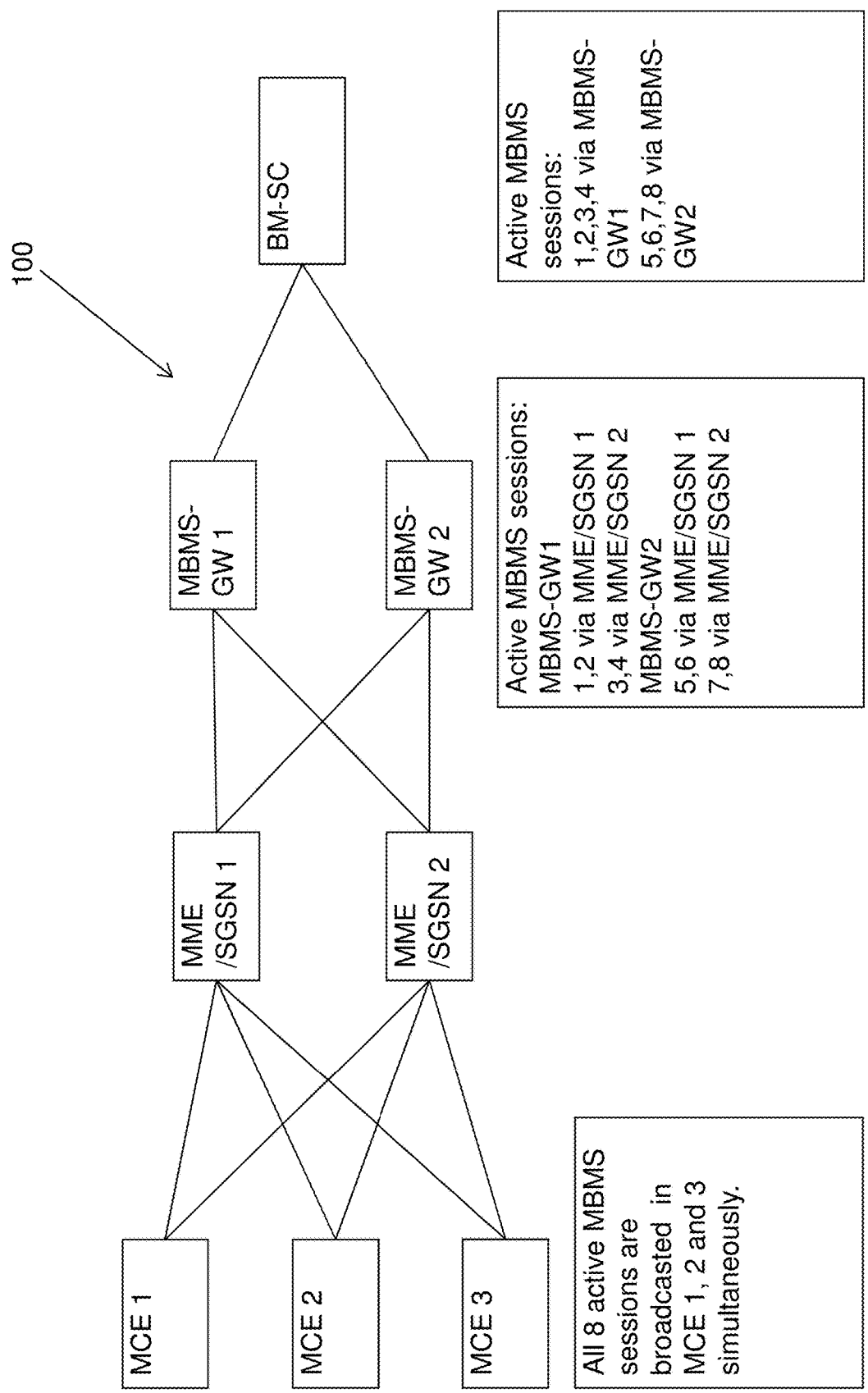
Fig. 3 eMBMS network for E-UTRAN access deployment

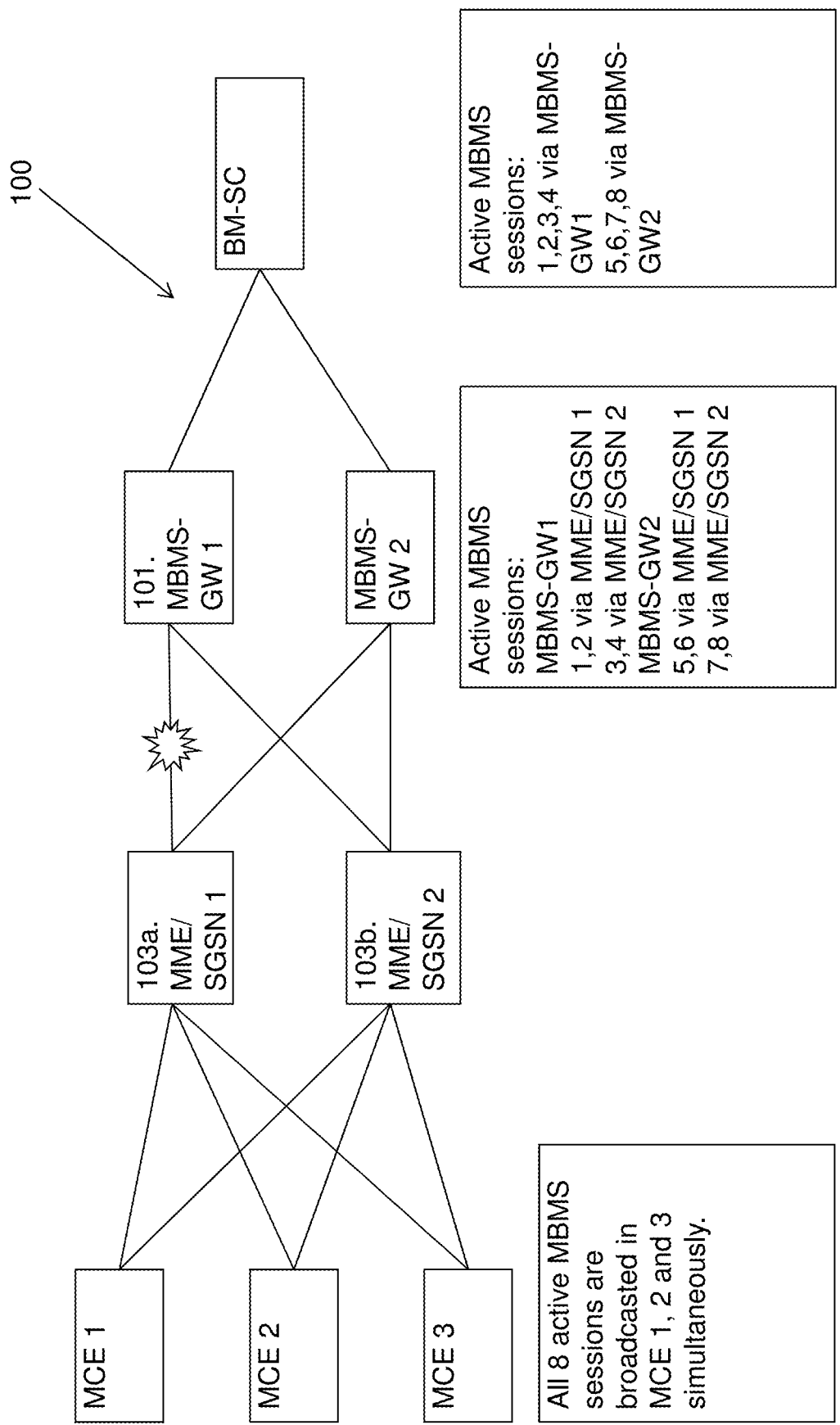
Fig. 4 Sn/Sm path failure scenario

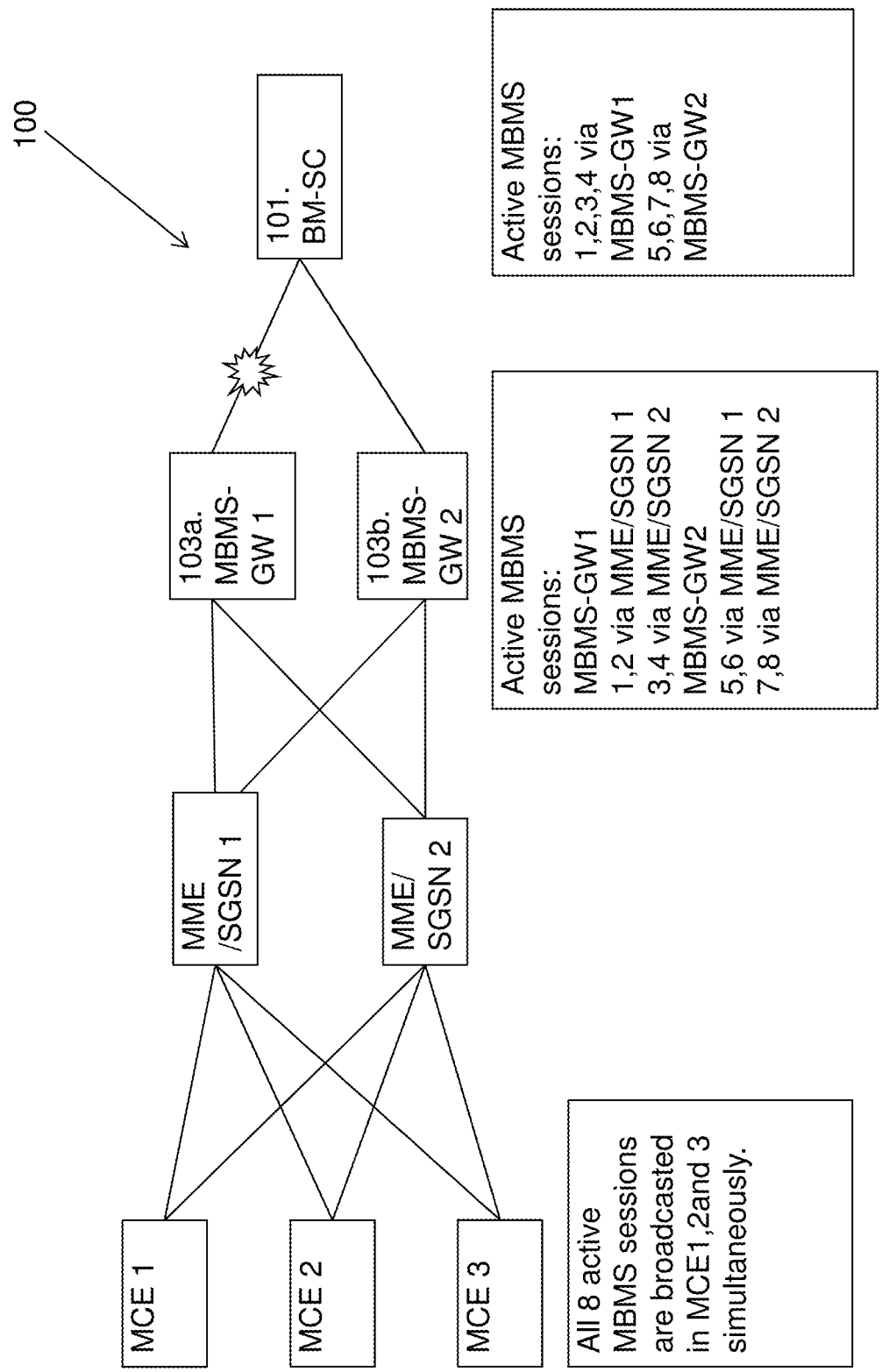
Figure 5 SGmb path failure scenario

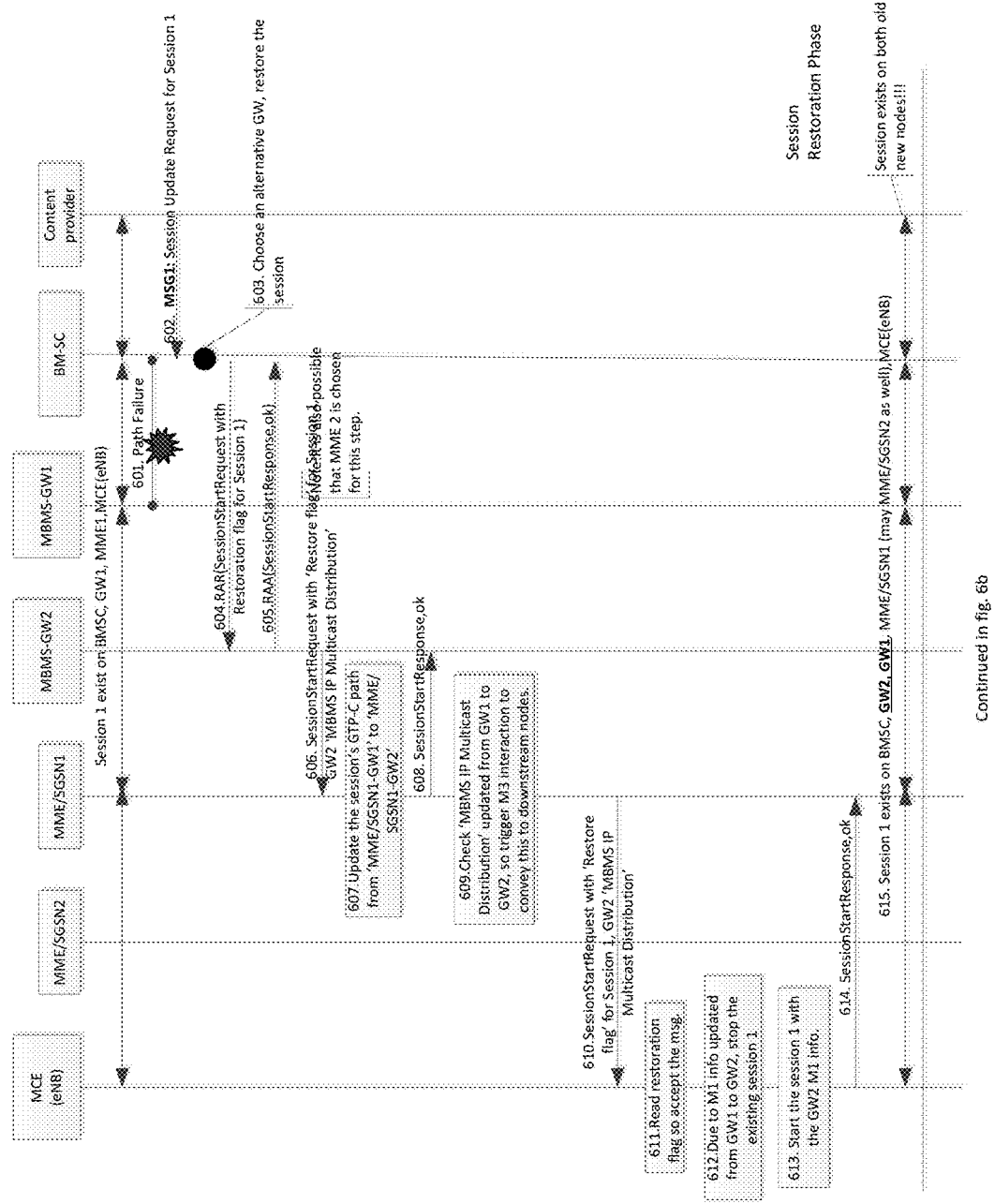
Figure 6A: Session Restoration for SGmb path failure

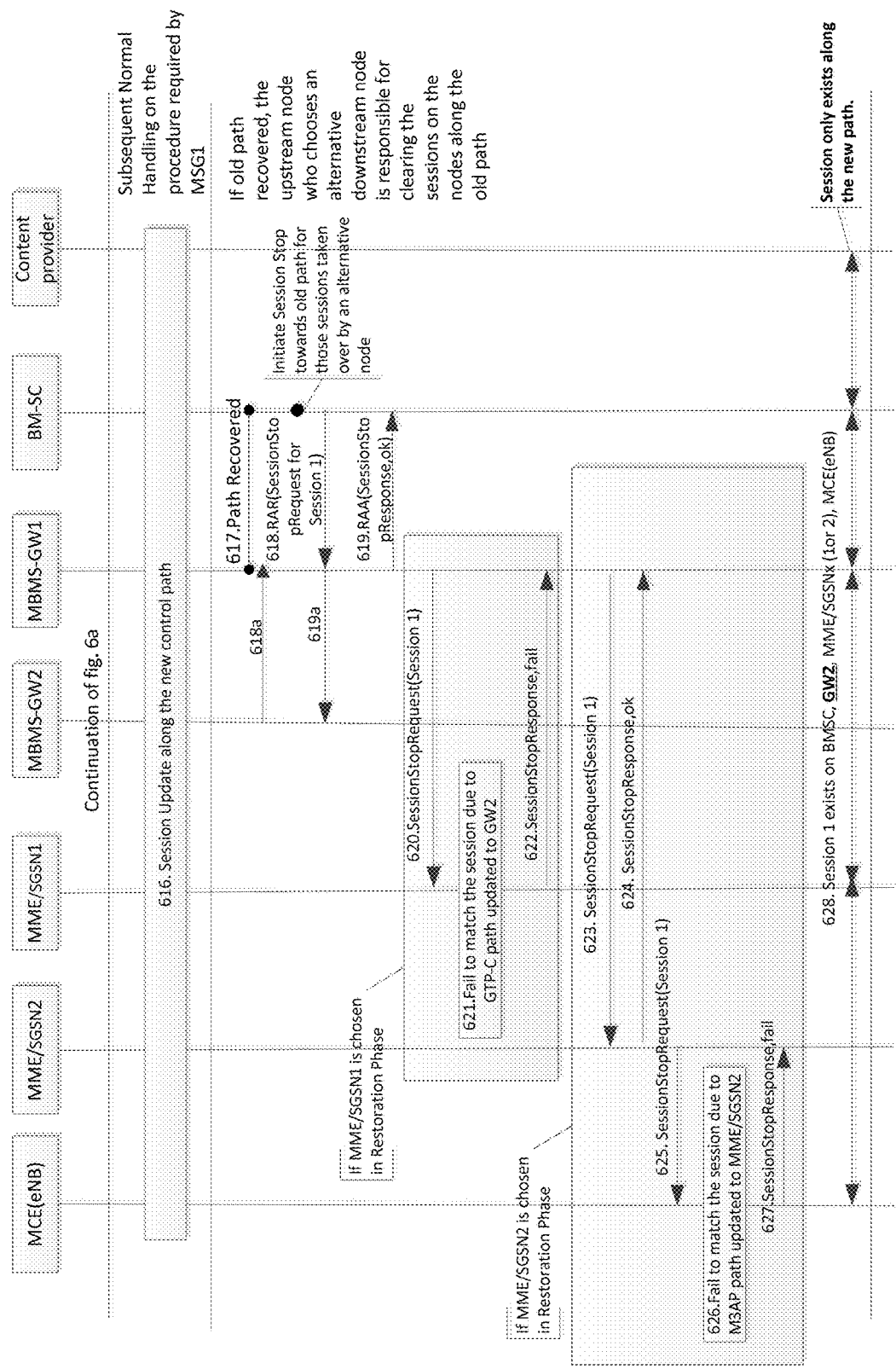
Figure 6B: Session Restoration for SGmb path failure, continued

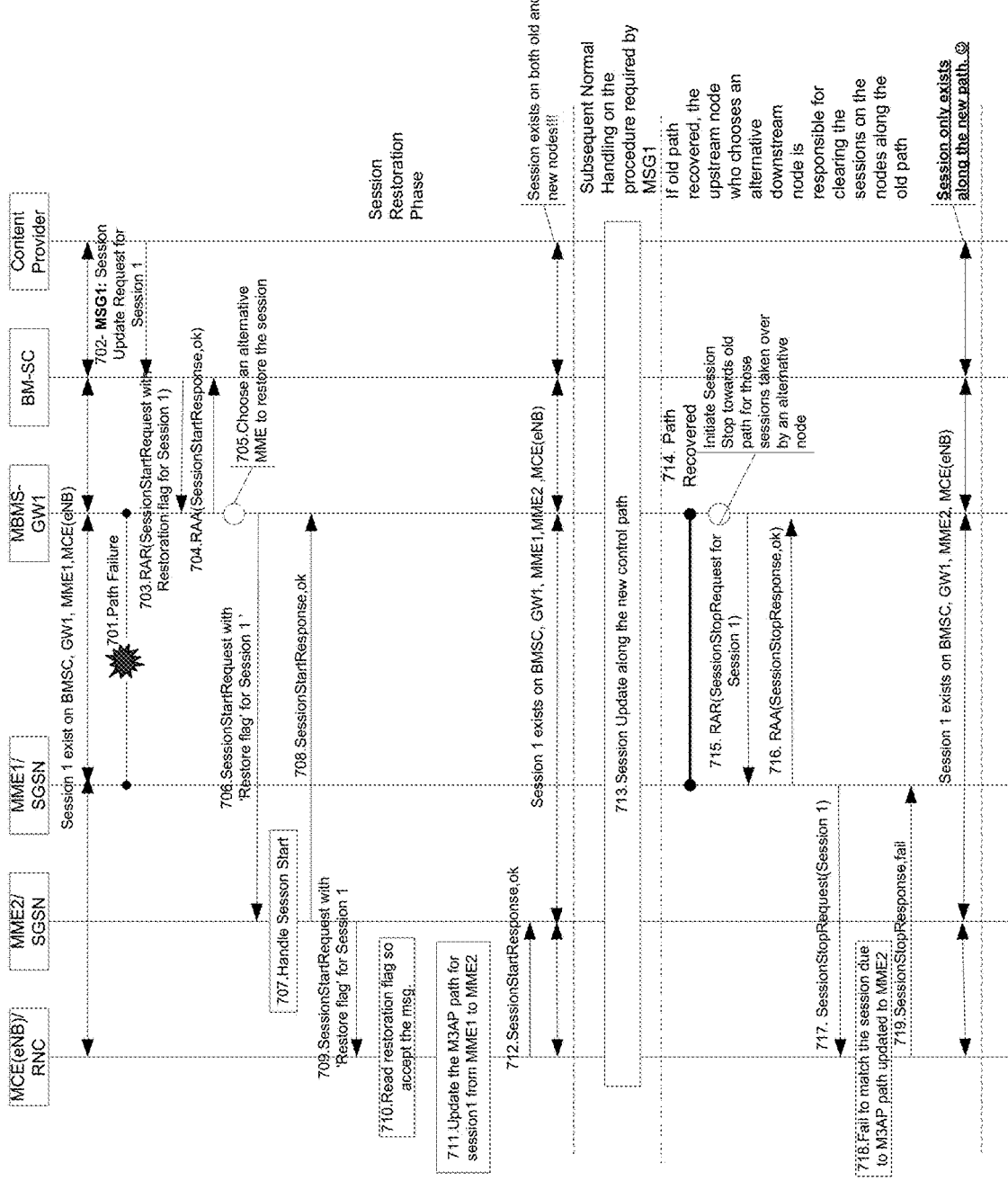
Figure 7: Session Restoration for Sn/Sm path failure

MBMS SESSION RESTORATION IN EPS FOR PATH FAILURE

CROSS-REFERENCE TO RELATED APPLICATIONS

This application is a continuation of Ser. No. 14/785,202, which has a section 371(c) date of Oct. 16, 2015 and which is the national stage application of International Patent Application No. PCT/EP2014/057722, filed Apr. 16, 2014, which claims priority to U.S. Provisional Patent Application Nos. 61/818,602 filed May 2, 2013 and 61/812,280 filed Apr. 16, 2013. The above identified applications are incorporated by this reference.

TECHNICAL FIELD

Embodiments herein relate generally to restoration procedures in a Multimedia Broadcast Multicast Service (MBMS) network (also referred to as evolved MBMS (eMBMS) network) in case of a path failure.

BACKGROUND

In a typical communications network a wireless device, communicates via a Radio Access Network (RAN) to one or more Core Networks (CNs). The communications network may also be referred to as e.g. a wireless communications network, a wireless communications system, a communications network, a communications system, a network or a system.

The wireless device may be a device by which a subscriber may access services offered by an operator's network and services outside operator's network to which the operator's radio access network and core network provide access, e.g. access to the Internet. The wireless device may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The wireless device may be portable, pocket storable, hand held, computer comprised, or vehicle mounted devices, enabled to communicate voice and/or data, via the radio access network, with another entity, such as another wireless device or a server.

The radio access network covers a geographical area which is divided into cell areas, with each cell area being served by a base station. The base station may be called a Radio Base Station (RBS), evolved NodeB (eNB), NodeB, B node, Radio Network Controller (RNC), Base Station Controller (BSC), Base Transceiver Station (BTS), MCE, depending on the technology and terminology used. A cell is a geographical area where radio coverage is provided by the radio base station at a base station site. The base station communicates with the wireless device(s) within range of the base station.

According to the 3GPP, Multimedia Broadcast Multicast Services (MBMS) "is a point-to-multipoint service in which data is transmitted from a single source entity to multiple recipients. Transmitting the same data to multiple recipients allows network resources to be shared." MBMS offers two modes: broadcast mode and multicast mode. The MBMS architecture enables efficient usage of radio network and core network resources. evolved MBMS (eMBMS) may be described as the Evolved Packet Core (EPC) version of MBMS. The eMBMS evolution brings improved performance thanks to higher and more flexible LTE bit rates, single frequency network operations, and carrier configuration flexibility.

In MBMS, there are some network nodes or functional entities which are important. Multi-cell/multicast Coordination Entity (MCE) is a network node or functional entity which is responsible for allocation of time and frequency resources for MBMS transmission. The MCE may be co-located with for example an eNB. Another network node is the MBMS-GW, which is the entry point for incoming broadcast/multicast data traffic. The MBMS-GW broadcasts data packets to all eNBs within an area. Broadcast Multicast-Service Centre (BM-SC) is a network node or functional entity which is necessary in order for a communications network to support MBMS. The BM-SC is in charge of providing service to the end user.

Some of the reference points in MBMS are Sn, SGmb and Sm. Sn is the reference point for the control plane between MBMS-GW and the SGSN. SGmb is the reference point for the control plane between BM-SC and the MBMS-GW. Sm is the reference point for the control plane between the Mobility Management Entity (MME) and the MBMS-GW. M3 Application Protocol (M3AP) supports the M3 interface which is between the MCE and the MBMS GW. A reference point may also be referred to as an interface. Signaling between nodes is exchanged at a reference point.

The purpose of a MBMS Session Start procedure is to request the radio access network to notify wireless devices about an upcoming MBMS Session of a given MBMS Bearer Service and to establish a MBMS Radio Access Bearer (RAB) and MBMS signalling connection for this MBMS Session. The MBMS Session Start procedure is triggered by the core network. For example, the core network initiates the procedure by sending a MBMS Session Start request message to the RNC. The MBMS Session Start request message comprises different parameters. The RNC acts according to the received MBMS Session Start request message. The RNC sends a MBMS Session Start response message or a MBMS Session Start failure message to the core network, depending on the outcome of the procedure.

According to 3GPP, the loss or corruption of the data stored in the aforementioned network entities for support of MBMS service(s) for each MBMS session context which are created by the MBMS Session Start procedure and updated by the MBMS Session Update procedure will seriously degrade the MBMS service(s) offered to mobile subscribers. It is therefore necessary to define procedures to limit the effects of such failure, and to restore the MBMS service with minimized impact to the mobile subscribers. Such restoration procedures are related to failure and/or restart of several types of network nodes and network paths/interfaces, such as e.g. MBMS-GW, MME, SGSN etc. The terms restoration and re-establishment are equivalent.

A failure may be a failure to receive a particular message, failure of a hardware or software component of a network node. A failure may be full/complete or partial. After a node has been restarted, all its bearer contexts are deleted.

3GPP has started a new project called eMBMS restoration procedures, where the objective of this project is to specify enhanced restoration procedures to explicitly define the EPS behavior and to enable restoration of the eMBMS service when possible in order to minimize the end-user service impact upon different kinds of failure over the control path. Examples of such failures are as follows: MBMS-GW failure/restart; MME/SGSN failure/restart; MCE failure/restart; BM-SC failure/restart; Sm/Sn path failure; M3AP path failure; SGmb path failure.

It has been agreed that the principle of these restoration procedures is to try to re-establish the control path to allow a subsequent MBMS session update and/or MBMS session stop. In addition, such re-establishing may be performed before bringing down the MBMS sessions. But the specific procedures under various failure scenarios are still under discussion.

The system behaviour upon restoration of a MBMS session towards an alternative downstream node during a SGmb path failure remains undefined in current standards.

SUMMARY

An objective of embodiments herein is therefore to obviate at least one of the above disadvantages and to provide an enhanced restoration procedure in a communications network.

This objective is attained in a first aspect of the present invention by a method in a network node for restoring an MBMS session after path failure. The method comprises detecting a path failure associated with an old path between the network node and an old control plane node, which old control plane node controls at least one MBMS session, and selecting an alternative control plane node to re-establish the at least one MBMS session. The method further comprises detecting that the old path between the network node and the old control plane node has been recovered, and sending to the old control plane node an MBMS session stop request in order to clear the MBMS session on the nodes along the old path involving the old control plane node.

This objective is attained in a second aspect of the present invention by a network node configured to restore an MBMS session after path failure, comprising a processor and a memory, which memory contains software that when executed by the processor, the network node is operative to detect a path failure associated with an old path between the network node and an old control plane node, which old control plane node controls at least one MBMS session, and select an alternative control plane node to re-establish the at least one MBMS session. The network node is further operative to detect that the old path between the network node and the old control plane node has been recovered, send to the old control plane node an MBMS session stop request in order to clear the MBMS session on the nodes along the old path involving the old control plane node.

This objective is attained in a third aspect of the present invention by a method in a control plane node for restoring an MBMS session after path failure, comprising receiving an MBMS session start request from a network node, and sending an MBMS session start request to an MCE. The method further comprises receiving an MBMS session start response from the MCE, and sending an MBMS session start response to the network node acknowledging the receipt of the MBMS session start request.

This objective is attained in a fourth aspect of the present invention by a control plane node configured to restore an MBMS session after path failure, comprising a processor and a memory, which memory contains software that when executed by the processor, the control plane node is operative to receive an MBMS session start request from a network node, and send an MBMS session start request to an MCE. Further the control plane node is operative to receive an MBMS session start response from the MCE, and send an MBMS session start response to the network node acknowledging the receipt of the MBMS session start request.

This objective is attained in a fifth aspect of the present invention by a method in an MCE for restoring an MBMS session after path failure where the MBMS session already exists on the MCE, comprising receiving an MBMS session start request comprising a re-establishment flag for the MBMS session from an alternative control plane node, and re-establishing the MBMS session with the alternative control plane node.

This objective is attained in a sixth aspect of the present invention by an MCE configured to restore an MBMS session after path failure where the MBMS session already exists on the MCE, comprising a processor and a memory, which memory contains software that when executed by the processor, the MCE is operative to receive an MBMS session start request comprising a re-establishment flag for the MBMS session from an alternative control plane node, and re-establish the MBMS session with the alternative control plane node.

Further provided are computer programs performing methods according to embodiments of the present invention, and computer program products comprising computer readable medium having the computer programs embodied therein.

Advantageously, with restoration procedures proposed by embodiments described herein, re-establishment of the control path is facilitated to allow a subsequent MBMS session update and/or MBMS session stop or similar. In addition, such re-establishment may advantageously be performed before bringing down the MBMS sessions.

A restoration flag is preferably set by the node who initiates a restoration procedure with re-selection of a downstream control node, e.g. the BM-SC selects an alternative MBMS-GW or the MBMS-GW selects an alternative MME. The restoration flag may be set and/or used together with a timer and/or a counter.

The timer may be set to the Max non-transient path failure timer node in the node (who initiates the restoration procedure) minus the time elapsed since the path failure is detected up to the moment when the reselection of the alternative control path, and addition of the difference between the Max non-transient path failure in the node (who initiates the restoration procedure) and the next downstream node. The counter is incremented if there is a subsequent path failure where the same node initiates the restoration procedure.

The restoration flag may be included in the MBMS session start request message or similar as long as the associated timer has not expired when a subsequent downstream failure takes place, e.g. during a Sm failure. An alternative MME may receive the MBMS session start request message together with at least one of a restoration flag, a timer and counter, before the timer expires. If there is a MCE restart and in order to re-establish the MBMS session, the MME may send the MBMS session start request message together with a restoration flag.

The receiving node may use the restoration flag together, possibly together with an associated timer and/or counter, to decide which MBMS Session Start message or similar may be accepted for the case that the same MBMS session is controlled by two or more different control plan nodes, e.g. MME/SGSN/MBMS-GW.

The receiving node may use the restoration flag together with an associated timer and/or counter, IP address of old control node, an indication if it is the first node in the restoration path, to decide if it should send a delete message to delete the MBMS session which becomes outdated in the old node.

The situation that the same MBMS session exists in more than one control path should be avoided, i.e. the MBMS session in the old control path should be deleted. It may be required for the node who initiates restoration with re-selection of an alternative downstream node to inform the old node to stop the MBMS sessions which have been taken over by the alternative node after a transient path failure is recovered. A control path is a path in which the control information is transmitted in the communications network. As an alternative, it may be required that the first downstream node informs the same type of network entity, i.e. the same level controlling node in the MBMS network, for example, at SGmb path failure, once the MBMS-GW2 receives a MBMS session start message with a restoration flag together with the old MBMS-GW1 address and with an indication which indicates that this MBMS-GW is the first downstream node upon the restoration control path. Then the MBMS-GW2 informs the MBMS-GW1 that the MBMS session has been taken over. As another example, at Sm failure, once the MME/SGSN2 receives MBMS session start message with a restoration flag together with the old MME/SGSN 1 address, and an indication which indicates this MME/SGSN is the first downstream node upon the restoration control path, then the MME/SGSN 2 informs MME1 that the MBMS session has been taken over.

The embodiments herein relating to restoring a session is presented by describing the node behaviors clearly upon various combinations of the restoration flag (a new flag over SGmb (3GPP TS 29.061), Sm/Sn (to be added in 3GPP TS 29.274), M3, M2 and Iu interface (to be added in 3GPP TS 25.413)) and other parameters.

The restoration flag may tell the receiver (e.g. MME/SGSN) this is a restoration procedure for the very same MBMS service identified by TMGI and Flow-ID.

If the same downstream node, e.g. MME/SGSN 1, is selected during the restoration procedure, by comparing the "MBMS IP Multicast Distribution" with the existing session information, the MME/SGSN 1 may get to know the Control information for the M1 interface changes or not. If it changes, then the MME/SGSN must convey this updated information to the RAN node. If it does not change, the M3 interaction is not needed if all other parameters are the same. The M1 interface is a pure user plane interface. A MBMS-GW is connected to multiple eNBs through M1 interface for data distribution. M3 and M2 are pure control plane interfaces. M3 is between the MME and MCE and mainly carries MBMS session management signaling. A MCE is connected to one or more eNBs within the same MBSFN through the M2 interface mainly for MBMS session management signaling and radio configuration signaling.

If a different downstream node, e.g. the MME/SGSN2, is selected, then both the old control plane node and the new control plane node will have the same MBMS session. The embodiments herein propose to stop the resource on the old control path by the upstream node (e.g. BM-SC who selects a new MBMS-GW in case of SGmb path failure, or MBMS-GW who selects a new MME in case of Sm path failure) after the old path is recovered.

Embodiments herein afford many advantages, of which a non-exhaustive list of examples follows.

An advantage of the embodiments herein may be that by using the restoration flag along the new path, all the nodes involved may clearly differentiate the restoration procedure from other procedures, thus being able to cope with different path failure scenarios.

Another advantage of the embodiments herein may be that by introducing the mechanism to allow the node which reselects alternative nodes during a MBMS Session restoration procedure to release/stop a MBMS Session resource in the old control plane nodes once the path is recovered. This solves the problem with having two substantially identical or at least closely related MBMS Sessions' co-existing on two nodes (e.g. two GWs, two MMEs).

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 3 is a schematic block diagram illustrating embodiments of a communications network.

FIG. 4 is a schematic block diagram illustrating embodiments of a communications network where a Sn/Sm path failure occurs.

FIG. 5 is a schematic block diagram illustrating embodiments of a communications network where a SGmb path failure occurs.

FIG. 6A and FIG. 6B are signaling diagrams illustrating embodiments of MBMS Session restoration when a SGmb path failure occurs.

FIG. 7 is a signaling diagram illustrating embodiments of MBMS Session restoration when a Sn/Sm path failure occurs.

The drawings are not necessarily to scale and the dimensions of certain features may have been exaggerated for the sake of clarity. Emphasis is instead placed upon illustrating the principle of the embodiments herein.

DETAILED DESCRIPTION

As mentioned above, the network behaviour upon an SGmb and/or Sn/Sm path failure remains undefined in current standards. During the path failure over any of the Sm/Sn/SGmb interfaces, the selection of an alternative control path may take place. The embodiments herein aim for providing analysis to such path failure scenarios:

The expected behavior of a downstream node, e.g. the RNC/MCE for a Sn/Sm failure, or the MME/SGSN for a SGmb path failure when it receive the request to restore an existing MBMS session, especially when the path towards an upstream node is still active.

How the resource allocated in the nodes in the old control path for those MBMS session which have been taken over may be released.

Figure 1:
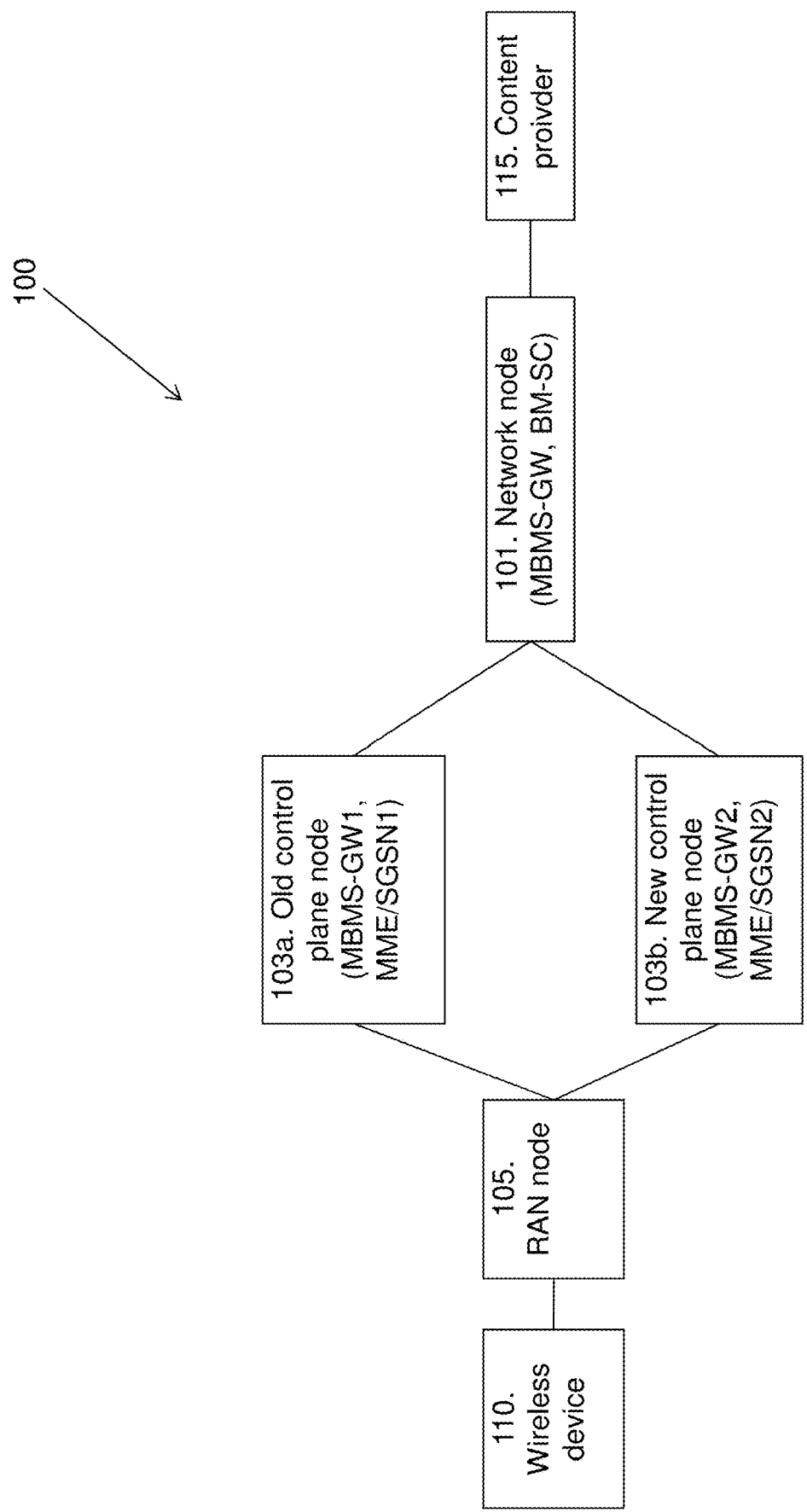
FIG. 1 is a schematic block diagram illustrating embodiments of a communications network.

FIG. 1 depicts a communications network 100 in which embodiments herein may be implemented. The communications network 100 may in some embodiments apply to one or more radio access technologies such as for example Long Term Evolution (LTE), LTE Advanced, Wideband Code Division Multiple Access (WCDMA), Global System for Mobile Communications (GSM), or any other Third Generation Partnership Project (3GPP) radio access technology, or other radio access technologies such as WLAN.

The communications network 100 comprises a network node 101. The network node 101 may be a BM-SC or a MBMS-GW. The network node 101 is connected to at least one of an old control plane node 103a and a new control plane node 103b. The old node may be indicated using the letter a or the number 1, and the new node may be indicated using the letter b or the number 2. The term "old" refers to a node which has been previously used and the term "new" refers to a node which will be used in the future. The network node 101 may be connected to an old node and then change to be connected to a new node. The old control plane node 103a may also be referred to as a first control plane node and the new control plane node 103b may also be referred to as a second control plane node. The old control plane node 103a may be a MBMS-GW or a MME/SGSN. The new control plane 103b may be a MBMS-GW or a MME/SGSN. The term MME/SGSN refers to a MME or a SGSN or a co-located MME/SGSN. The old control plane node 103a controls a number of MBMS sessions. After a path failure between the network node 101 and the old control plane node 103a, the network node 101 selects an alternative or new control plane node, i.e. the new control plane node 103b to re-establish the MBMS sessions. Thus, the control information, i.e. signaling, is conveyed over a new path instead of the old path.

A control plane node is a node which carries control information, also known as signaling. As a contrast, a user plane node carries the network's user traffic.

The communications network 100 comprises a RAN node 105 connected to the old control plane node 103a and a new control plane node 103b. The RAN node 105 is directly connected to the old control plane node 103a and the new control plane node 103b or it is connected to the old control plane node 103a and the new control plane node 103b via other old and new control plane nodes (not shown). The RAN node 105 may be a base station such as a NodeB, an evolved NodeB (eNB), a Radio Network Controller (RNC), a Multi-cell/Multicast Coordination Entity (MCE), or any other network unit capable to communicate over a radio carrier with a wireless device 110 being present in a cell.

The wireless device 110 may be a device by which a subscriber may access services offered by an operator's network and services outside operator's network to which the operators radio access network and core network provide access, e.g. access to the Internet. The wireless device 110 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The wireless device 110 may be portable, pocket storable, hand held, computer comprised, or vehicle mounted devices, enabled to communicate voice and/or data, via the radio access network, with another entity, such as another wireless device or a server.

The network node 101 is connected (directly or via another node) to a content provider 115 which broadcasts services to the wireless device 110.

It should be noted that the communication link between the network nodes may be of any suitable kind including either a wired or wireless link. The link may use any suitable protocol depending on type and level of layer (e.g. as indicated by the OSI model) as understood by the person skilled in the art.

In the communications network 100, the term downstream refers to the direction from a content provider 115 to the wireless device 110. So, the old and new control plane nodes 103a, b and the RAN node 105 may be seen as downstream nodes.

Figure 2A:
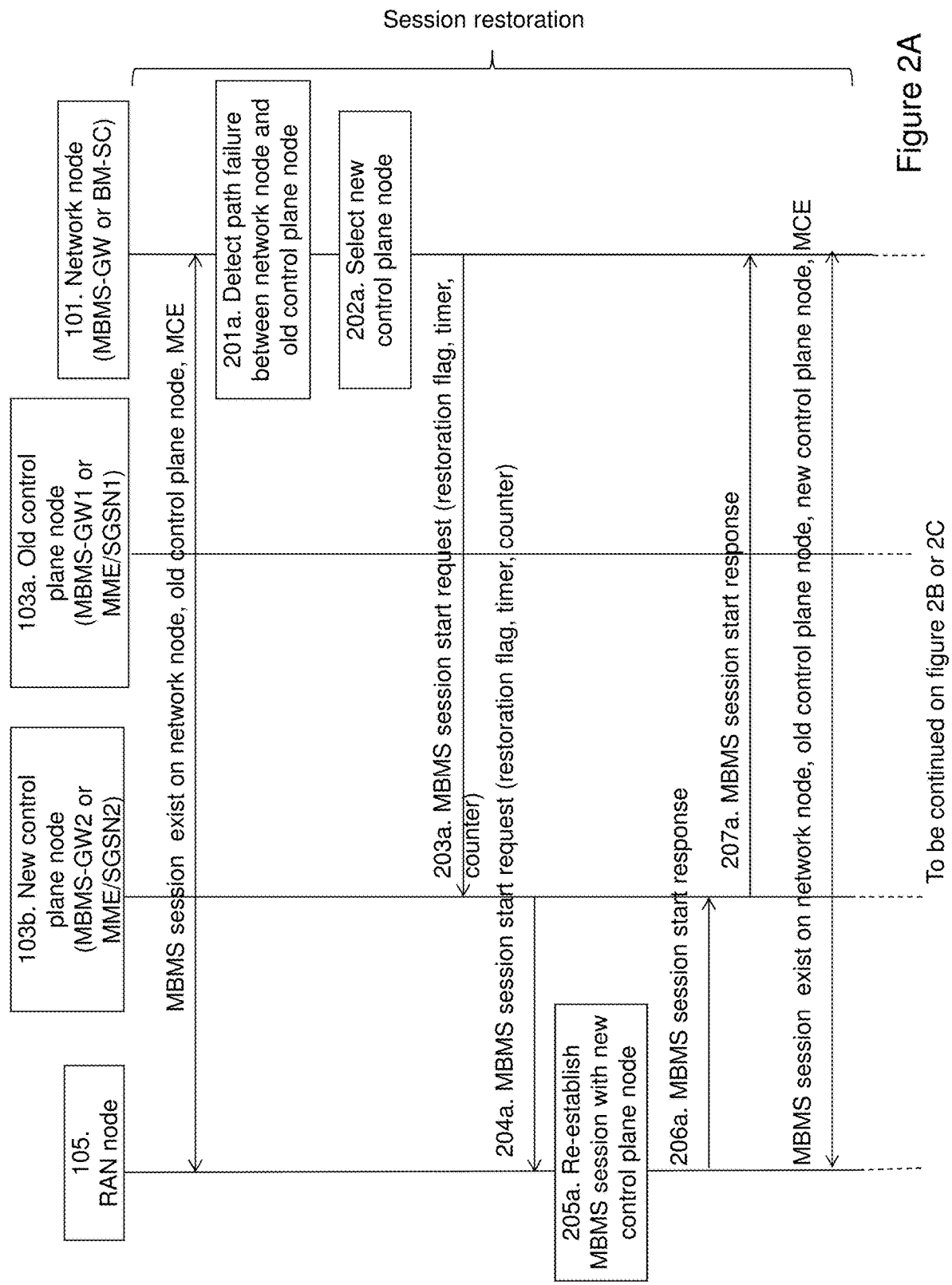
FIGS. 2A-C are signaling diagrams illustrating embodiments of a method in a communications network.
Figure 2B:
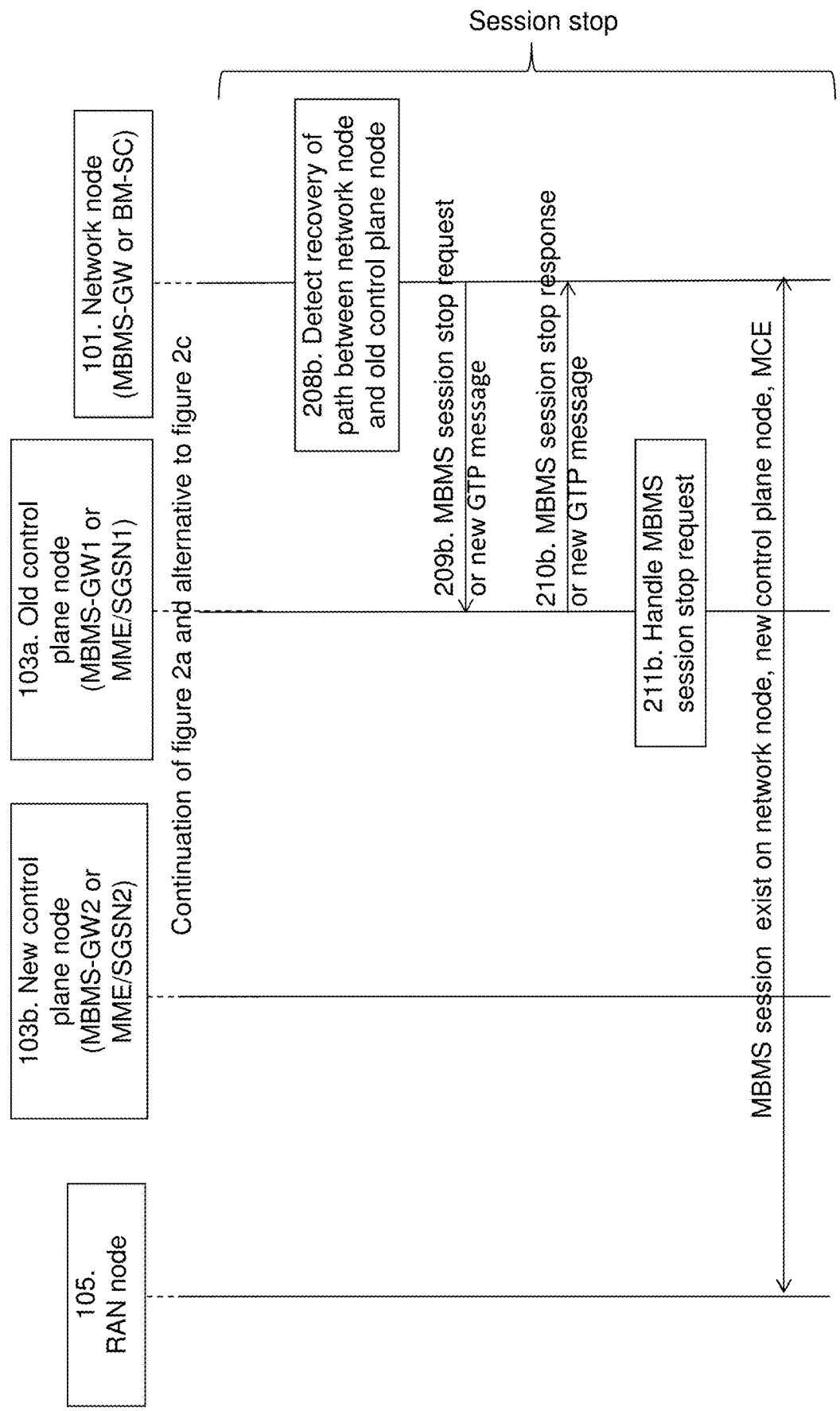
Figure 2C:
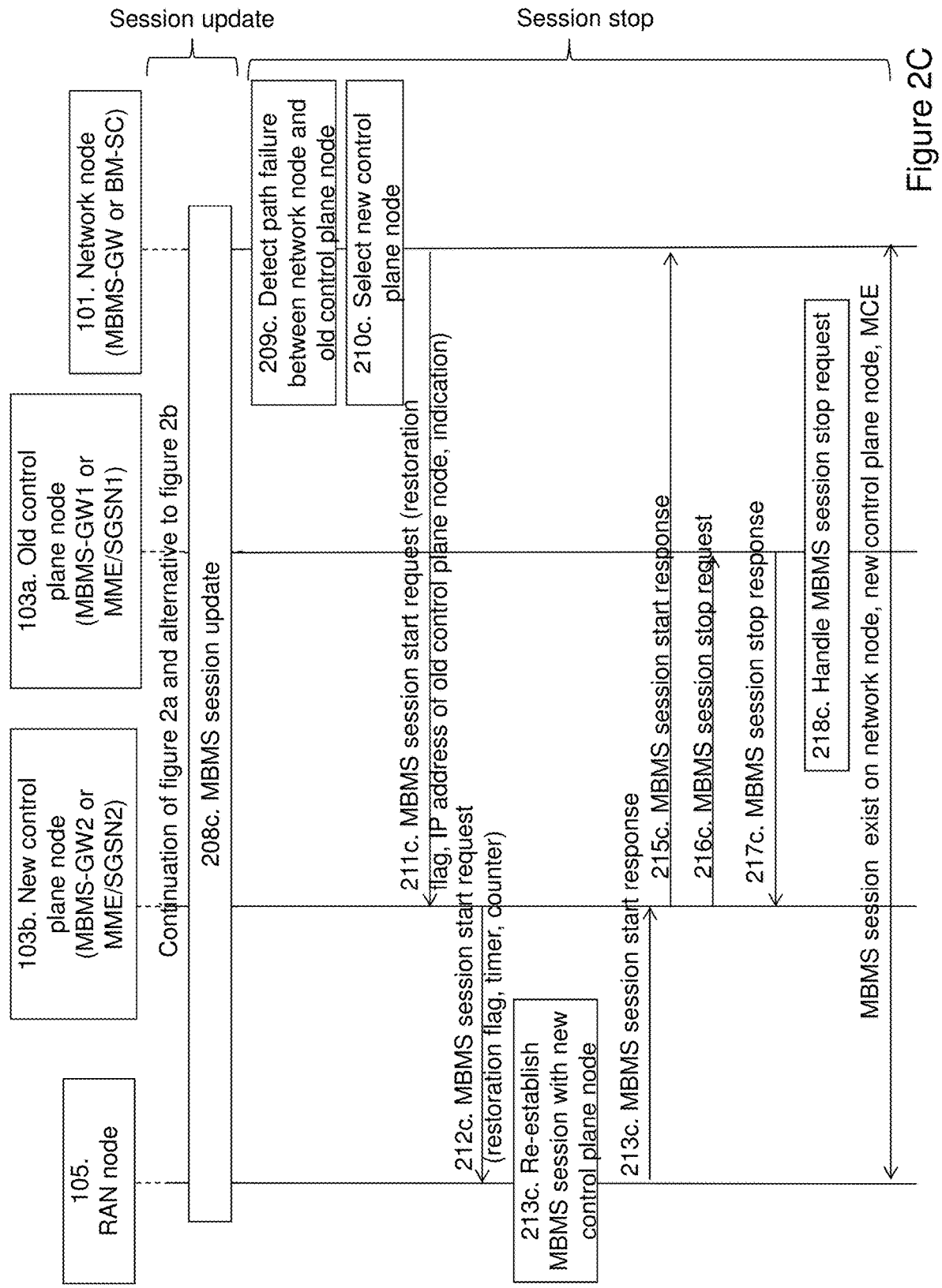

The method for session restoration after a path failure, according to some embodiments will now be described with reference to the signaling diagram depicted in FIG. 2A, FIG. 2B and FIG. 2C. The steps 201a-207a in FIG. 2A is performed first, then the steps 208b-211b in FIG. 2B or the steps 208c-218c in FIG. 2C is performed. As an alternative to the steps 208b-211b, the steps 208c-218c in FIG. 2C is performed. FIG. 2A describes the session restoration phase. FIG. 2B describes the session stop procedure to delete the resource for those MBMS sessions have been relocated to an alternative control path. FIG. 2C describes an alternative procedure to the procedure described in FIG. 2B where the first downstream control plane node deletes the resource on the old control plane path when it receives a MBMS session start request message with at least one of a restoration flag, IP address of the old control node and an indication to indicate that it is the first downstream node.

At start of the method, a MBMS session exists on the network node 101, the old control plane node 103a and the RAN node 105, and possibly also on another old control plane node (not shown).

The method comprises the following steps, which steps may as well be carried out in another suitable order than described below.

Step 201a

This step is seen in FIG. 2A. The network node 101 detects a path failure associated with the path between the network node 101 and the old control plane node 103a. The path failure may be a transient path failure, which will be described in more detail below. As mentioned above, the old control plane node 103a controls at least one MBMS session.

Step 202a

This step is seen in FIG. 2A. The network node 101 selects a new control plane node 103b to re-establish the MBMS session that has failed. The selection of the new control plane node 103b may take place before a path failure timer has expired and/or it may take place after having received a session update or stop request from a content provider 115. The failure may be a Sn/Sm path failure if the network node 101 is a MBMS-GW and the old control plane node 103a and the new control plane node 103b are MME/SGSNs. The failure may be a SGmb path failure if the network node 101 is a BM-SC and the old control plane node 103a and the new control plane node 103b are MBMS-GWs.

Step 203a

This step is seen in FIG. 2A. The network node 101 sends a MBMS session start request to the new control plane node 103b. The MBMS session start request comprises at least one of a restoration flag a timer and a counter for the failed MBMS session. The purpose of restoration flag is to allow the RAN node 105 or the new control plane node 103b to accept the MBMS Session Start request message for the very same service as before the failure. The restoration flag is needed as the RAN node 105 or the new control plane node 103b needs to differentiate whether it is an error (so it may reject it) or whether it is a restoration procedure (so it may accept it).

Step 204a

This step is seen in FIG. 2A. The new control plane node 103b sends the MBMS session start request comprising at least one of the restoration flag, the timer and the counter to the RAN node 105. The MBMS session start request may be sent directly to the RAN node 105 or it may be sent to the RAN node 105 via another old control plane node (now shown).

Step 205a

This step is seen in FIG. 2A. When the RAN node 105 receives the restoration flag, it knows that it may accept the MBMS session start request. As a consequence, the RAN node 105 stops the MBMS session related to the old control plane node 103a and re-establishes the MBMS session with the new control plane node 103b from which the restoration flag was received.

Step 206a

This step is seen in FIG. 2A. The RAN node 105 sends a MBMS session start response message to the old control plane node 103b.

Step 207a

This step is seen in FIG. 2A. The new control plane node 103b sends a MBMS session start response to the network node 101 acknowledging receipt of the request in step 203a.

Thus, the MBMS session exists on the network node 101, the old control plane node 103a, the new control plane node 103b and the MCE. The MBMS session may also exists on another old control plane node (not shown).

The steps of FIG. 2B will now be described. The steps of FIG. 2B are alternatives to the steps shown in FIG. 2C. In FIG. 2B, the node who initiates restoration procedure is able to stop the MBMS session in the old control plane node 103a.

Step 208b

This step is seen in FIG. 2B. The network node 101 detects that the path between the network node 101 and the old control plane node 103a has been recovered.

Step 209b

This step is seen in FIG. 2B. The network node 101 sends a MBMS session stop request or a new GTP message for the same purpose for the MBMS session to the old control plane node 103a in order to clear the MBMS session on the nodes along the old path. The old path is the path that involves the old control plane node 103a. The MBMS session stop message may be further forwarded to the old MME/SGSN if the old control plane node 103a is a MBMS-GW. GTP is short for General packet radio service Tunneling Protocol.

Step 210b

This step is seen in FIG. 2B. The old control plane node 103a sends a MBMS session stop response or a new GTP message for the same purpose to the network node 101 to acknowledge the receipt of the request which was received in step 209b.

Step 211b

This step is seen in FIG. 2B. The old control plane node 103a handles the MBMS session stop request for the MBMS session. As a result of the handling of the MBMS session stop request, the MBMS session along the old path is cleared since the MBMS session is taken over by the new control plane node 103b. The handling of the MBMS session stop request is different depending on which node the old and new control plane nodes are and depending on their behavior. These differences will be described in more detail below with reference to FIG. 6B. After steps 208b-211b has been performed, the MBMS session only exists on the network node 101, the new control plane node 103b and the RAN node 105. In some embodiments, the MBMS session also exists on another control plane node (not shown). Thus, the MBMS session only exists along the new path. The new path is the path that involves the new control plane node 103b.

The steps of FIG. 2C will now be described. The steps of FIG. 2C are alternatives to the steps shown in FIG. 2B. FIG. 2C describes that the newly selected control plane node is able to delete the resource allocated for the given MBMS session in the old node (same type of node), e.g. if a MBMS GW is selected, it should send a delete message to the old MBMS-GW.

Step 208c

This step is shown in FIG. 2C. A MBMS session update is performed along the new control path involving the new control plane node 103b.

Step 209c

This step is seen in FIG. 2C. The network node 101 detects that the path between the network node 101 and the old control plane node 103a has been recovered.

Step 210c

This step is seen in FIG. 2C. The network node 101 selects a new control plane node 103b.

Step 211c

This step is seen in FIG. 2C. The network node 101 sends a MBMS session start request to the new control plane node 103b. The MBMS session start request comprises at least one of a restoration flag, the IP address of the old control plane node 103a and an indication to indicate that the new control plane node 103b is the first downstream node which is required to delete the resource on the old control plane path for those MBMS session which have been reallocated on the new control plane node 103b. The IP address of the old control plane node 103a makes it possible for the new control plane node 103b to send a delete message to the old control plane node 103a. The purpose of restoration flag is to allow the RAN node 105 or the control plane node to accept the MBMS Session Start request message for the very same service as before the failure. The restoration flag is needed as the RAN node 105 or the control plane node needs to differentiate whether it is an error (so it may reject it) or it is a restoration procedure (so it may accept it).

Step 212c

This step is seen in FIG. 2C. The new control plane node 103b sends the MBMS session start request comprising at least one of the restoration flag, a timer and a counter to the RAN node 105. The MBMS session start request may be sent directly to the RAN node 105 or it may be sent to the RAN node 105 via another old control plane node (now shown).

Step 213c

This step is seen in FIG. 2C. When the RAN node 105 receives the restoration flag, it knows that it may accept the MBMS session start request. As a consequence, the RAN node 105 stops the MBMS session related to the old control plane node 103a and re-establishes the MBMS session with the new control plane node 103b from which the restoration flag was received.

Step 213c

This step is seen in FIG. 2C. The RAN node 105 sends a MBMS session start response message to the network node 101.

Step 215c

This step is seen in FIG. 2C. The new control plane node 103b sends a MBMS session start response to the network node 101 acknowledging receipt of the request in step 211c.

Step 216c

This step is seen in FIG. 2C. The new control plane node 103b sends a MBMS session stop request to the old control plane node 103a. The MBMS session stop request comprises an indication to indicate that the delete is part of a restoration procedure or a new GTP message for the same purpose for deleting the MBMS session in order to clear the MBMS session on the nodes along the old path. The MBMS stop message may be further forwarded to the old MME/SGSN if the old control plane node 103a is a MBMS-GW.

Step 217c

This step is seen in FIG. 2C. The old control plane node 103a sends a MBMS session stop response or a new GTP message for the same purpose to the network node 101 to acknowledge the receipt of the request which was received in step 216c.

Step 218c

This step is seen in FIG. 2C. The old control plane node 103a handles the MBMS session stop request for the MBMS session. As a result of the handling of the MBMS session stop request, the MBMS session along the old path is cleared since the MBMS session is taken over by the new control plane node 103b. The handling of the MBMS session stop request is different depending on which node the old and new control plane nodes are and depending on their behavior. These differences will be described in more detail below with reference to FIG. 6B. After steps 208c-218c has been performed, the MBMS session only exists on the network node 101, the new control plane node 103b and the RAN node 105. In some embodiments, the MBMS session also exists on another control plane node (not shown). Thus, the MBMS session only exists along the new path, i.e. the path involving the network node 101, the new control plane node 103b and the MCE.

FIG. 3 depicts an embodiment of the communications network 100 for E-UTRAN access deployment. The embodiment shown in FIG. 3 is a simplified eMBMS network.

It is assumed that there are 8 different MBMS sessions broadcasted in the network 100, which are shared among the same type of control plane entities, e.g. between MME/SGSN1 and between MBMS-GWs, to allow load sharing. The network 100 comprises three Multi-cell/multicast Coordination Entities (MCE): MCE 1, MCE 2 and MCE 3. The MCEs in FIG. 3 corresponds to the RAN node 105 in FIG. 1. All 8 active MBMS sessions are broadcasted in MCE 1, 2 and 3 simultaneously. Each of the MCEs are connected to two Mobility Management Entities (MME/SGSNs), i.e. MME/SGSN 1 and MME/SGSN 2. The MME/SGSNs in FIG. 3 may also be a SGSN or a co-located MME/SGSN. Each of the two MME/SGSNs is connected to two Multimedia Broadcast Multicast Service Gateways (MBMS-GWs), i.e. MBMS-GW 1 and MBMS-GW 2. The active MBMS sessions for MBMS-GW1 are session 1, 2 via MME/SGSN 1 and session 3, 4 via MME/SGSN 2. The active MBMS sessions for MBMS-GW2 are sessions 5, 6 via MME/SGSN 1 and sessions 7, 8 via MME/SGSN 2. The MBMS-GW 1 and the MBMS-GW 2 are both connected to a Broadcast Multicast-Service Centre (BM-SC). The active MBMS sessions for the BM-SC are sessions 1, 2, 3, 4 via the MBMS-GW1 and sessions 5, 6, 7, 8 via MBMS-GW2. Note that the network 100 may comprise any other suitable number of MCEs, MME/SGSNs, MBMS-GW and BM-SCs than shown in FIG. 3. The MME/SGSN 1 and the MME/SGSN 2 or the MBMS-GW 1 and MBMS-GW2 in FIG. 3 may correspond to the old control plane node 103a and the new control plane node 103b in FIG. 1. The MBMS-GW1 or the BM-SC in FIG. 3 may correspond to the network node 101 in FIG. 1.

In the following, the terms eMBMS and MBMS may be interchangeable used.

In eMBMS, for the path failure over any of the Sm or Sn or SGmb interfaces, the selection of an alternative/new control path may take place. Thus, the method for how to setup and/or update MBMS Sessions along the new path and how to stop the MBMS Sessions on the old path needs to be clearly described.

The embodiments herein aim for providing proposals on solving at least the following two questions: (1) How the network nodes, including at least one of the RNC/MCE (eNB) MME/SGSN, the MBMS-GW and the BM-SC, may react on the MBMS6a Session start request to restore an existing MBMS session for at least one of the Sm and Sn and SGmb path failure. (2) How the resource(s) allocated in the network nodes in the old control path may be released.

MME/SGSN, RNC/MCE Behaviour for Sn/Sm Failure

FIG. 4 illustrates an example of the behavior of the MME/SGSN and the RNC/MCE when a failure in the Sn/Sm path occurs. In FIG. 4, the network node 101 of FIG. 1 is represented by the MBMS-GW1, the old control plane node 103a of FIG. 1 is represented by the MME/SGSN1, the new control plane node 103b of FIG. 1 is represented by the MME/SGSN2 and the RAN node 105 of FIG. 1 is represented by three MCEs. In the following example shown in FIG. 4, it is assumed that before the Sm failure, the MME/SGSN 1 controls MBMS sessions 1, 2, 5 and 6. Then there is a Sm path failure between the MME/SGSN 1 and the MBMS-GW1, indicated with a star in FIG. 4. It is also assumed that a Maximal Sm path failure timer configured in the MME/SGSN is 120 seconds. The same timer configured in the MBMS-GW is 115 seconds. The shorter latter timer is to re-establish control path before bringing down the MBMS session.

The re-selection of the MME/SGSN may take place before or after the Maximal Sm path failure timer in the MBMS-GW expires:

(A) If the re-selection takes place after the Maximal Sm path failure timer expires, it may be regarded as a non-transient failure and the new MME/SGSN 2 will take over the MBMS sessions 1 and 2. The old MME/SGSN1 will delete all affected MBMS sessions 1 and 2. But there is a small risk related to this since both the old MME/SGSN1 and new MME/SGSN2 have the same MBMS sessions (1 and 2) for 20 seconds due to the difference between the Maximal Sm path failure timer configured in the MME/SGSN and the same timer configured in the MBMS-GW.

(B) However, if the re-selection takes place before the timer expired, i.e. when the path failure is regarded as a transient failure, if the MBMS-GW1 received MBMS Session update for MBMS session 1 at 30 seconds, the MBMS-GW1 tries to re-establish the control path by selecting the MME/SGSN 2. The MME/SGSN 2 will then send the MBMS session start request message for MBMS session 1 to the MCEs 1, 2 and 3.

Afterwards, there will be two cases, the Sm path failure becomes a non-transient path failure; the Sm link recovers before the timer expires, i.e. MBMS session 2 will be kept by MME/SGSN 1, while the MBMS session 1 has been taken over by the MME/SGSN 2. For both cases, the MBMS sessions taken over by other MME/SGSN may be deleted in the old MME/SGSN i.e. the MBMS Session 1 should be deleted in the MME1.

Conclusion: for both scenarios A and B, there are two issues.

(Issue 1) The situation where both the old MME/SGSN and new MME/SGSN have the same MBMS session needs to be solved. This is because if one of the three MCEs restarts, both MME/SGSNs will try to re-establish the MBMS Session.

(Issue 2) The MCE/RNC may be allowed to differentiate a restoration procedure from a normal error scenario, e.g. a ghost message due to a transmission problem. Especially, as specified in the 3GPP specification TS 25.413, V. 11.3.0, it has explicitly required in the clause 8.36.4 that the RNC may reject the MBMS session start request from another SGSN if the MBMS session is already controlled by an SGSN, that means there is a valid error scenario.

To solve issue 1:

(1) A first alternative may be to let the MCEs send a RESET message with a takeover indication to the MME/SGSN 1 as long as the MCEs accept that the new MME/SGSN has taken over the control path. A drawback of this may be that, before receiving all RESET messages from the MCE(s), the MME/SGSN 1 cannot immediately delete the MBMS session. Instead the MME/SGSN 1 may set the MBMS session as "invalid" upon receiving the first Reset, and start a timer. The timer may be a guard timer. Before the timer expires, the MME/SGSN may not restart the MBMS Session upon receiving the Reset or M3 Setup from any MCE, e.g. due to a M3 path failure or a MCE failure. After the timer has expired, the MME/SGSN may then remove the MBMS Session and send a MBMS Session Stop Request to those MCEs which have not sent a RESET message with a takeover indication, as some of MCEs may not accept the MBMS Session Start Request message from the alternative MME/SGSN2. A drawback of this embodiment may be that it may complicate the MME/SGSN implementation, especially when distributed mode applies, where the MCE is co-located with the eNB. This leads the timer to be difficult to predict.

(2) A second alternative which solves issue 1 is that the MBMS-GW informs the MME/SGSN 2 to delete the MBMS Session 1 in the MME1 as the MBMS session 1 has been relocated in the MME/SGSN 2, by including at least one of a restoration flag, an IP address of the MME/SGSN 1 and an indication to require MME/SGSN 2 to delete the MBMS session on the old MME/SGSN 1 in the MBMS Session Start Request message. If the path is recovered before the timer expires, the MBMS-GW deletes the MBMS sessions which have been taken over by another MME/SGSN. A risk here may be that both the old MME/SGSN and the new MME/SGSN may have the same MBMS session between the time when the MBMS session is being taken over and the time when the Sm path is recovered.

(3) A third alternative which solves issue 1 is that when MME/SGSN2 receives MBMS Session start request message with at least one of a restoration flag, the IP address of the old MME/SGSN and an indication to indicate that this MME/SGSN should delete the resource allocated in the old MME/SGSN for the MBMS session that has been relocated by the MBMS-GW1 on the MME/SGSN 2. After the MME/SGSN2 has received the acknowledgement as result of the MBMS session start request message, the MME/SGSN 2 send a MBMS session stop message with an indication to indicate the delete is part of restoration procedure or a new GTP message for the same purpose to delete the MBMS session which has been relocated to the MME/SGSN 2 on the old MME/SGSN 1.

To solve issue 2:

(1) The MCE/RNC needs a restoration flag comprised in the MBMS Session Start Request message to differentiate that this is a restoration procedure, with a possible changed parameter, the MCE/RNC should accept it.

MME/SGSN Behaviour for SGmb Path Failure

The MME/SGSN behavior for a SGmb path failure is exemplified in FIG. 5. In FIG. 5, the network node 101 of FIG. 1 is represented by the BM-SC, the old control plane node 103a of FIG. 1 is represented by the MBMS-GW1, the new control plane node 103b of FIG. 1 is represented by the MBMS-GW2 and the RAN node 105 of FIG. 1 is represented by three MCEs. In FIG. 5, it is assumed that before the SGmb path failure, the MBMS-GW 1 is controlling MBMS sessions 1, 2, 3 and 4. And then there is a SGmb path failure between the BM-SC and the MBMS-GW 1 as indicated with a star in FIG. 5.

When the BM-SC has detected the SGmb path failure and if it receives a MBMS Session update or a stop request from a content provider 115 during a transient path failure, the BM-SC may select an alternative MBMS-GW to reestablish MBMS sessions.

For example, during this period, the MBMS sessions 1 and 2 needs to be updated. The BM-SC selects the MBMS-GW 2, and the MBMS GW2 selects the MME/SGSN 1 for the MBMS session 1 and selects the MME/SGSN 2 for the MBMS session 2.

There may be two issues, which are similar to the ones described for the Sn/Sm failure in FIG. 4 above:

Issue 3: MBMS session 1 is currently controlled by the MME/SGSN 1. Now it receives another MBMS session start request from another MBMS-GW who has to newly allocate both the Common-Tunnel Endpoint ID (C-TEID) and the Internet Protocol (IP) multicast address. With the different IP Multicast Source Address, should the MME/SGSN accept the request or should it reject it? I.e. should it treat it as an error (it could be an error due to poor transportation network, e.g. ghost message)? If accepted, should it only respond to the MBMS-GW with a successful MBMS Session Start Response message or should the MME/SGSN convey the updated Control information for the M1 interface (C-TEID, IP multicast addresses) along the control plane interfaces (M3, M2) to the eNB?

Issue 4: There will be a risk that both MBMS-GWs have the same MBMS session. Therefore, it would be problematic if there is a subsequent Sm/Sn/M3/Iu failure because two MBMS-GWs may then try to re-establish the MBMS session. So the MBMS session in the old MBMS-GW may be deleted as soon as the MBMS session has been taken over by another MBMS-GW.

Issue 3 is applicable for the case that a new MME/SGSN is selected in case of a Sm failure. There may be a risk that the same MBMS session exists in two MME/SGSNs at the same time. So, if there is another M3AP path failure or a MCE failure, both MME/SGSNs will try to re-establish the MBMS session.

For the issue 3, if the MME/SGSN 1 obtains a restoration flag in the MBMS Session Start Request with a "MBMS IP Multicast Distribution" updated, it may overwrite the existing MBMS session towards the MBMS-GW1 and send a new MBMS Session start message towards the MCEs together with the restoration flag.

If it is the MME/SGSN 2 that receives the MBMS Session Start Request from the MBMS-GW 2 together with a restoration flag, e.g. for MBMS Session 2 in this example, as there is no existing MBMS Sessions identified by the Temporary Mobile Group Identity (TMGI) and Flow-ID, it may handle it as a new MBMS Session and send it to the MCEs but together with the restoration flag. A TMGI uniquely identifies an MBMS bearer, which transports a MBMS service. The TMGI is structured in a way that it is possible to define a unique TMGI for a particular service within every network.

Inclusion of the restoration flag helps the MCE/RNC to know that it is a restoration procedure and to accept the MBMS Session start request message from a MME/SGSN other than the current ones. This may solve also the issue 2 described with reference to FIG. 4 above.

For issue 4, apparently an embodiment using the first alternative which uses a RESET with a take-over indication as described in relation to the first alternative in FIG. 4 would not work for the SGmb path failure, as there is no similar message to allow the MME/SGSN to inform the old MBMS-GW.

Using the second alternative by letting the MBMS-GW2 send a MBMS stop message to the MBMS-GW1 to delete the MBMS Session 1 will work.

The embodiment, described in relation to the third alternative in FIG. 4 will work. The embodiment in FIG. 4 describes to let the node who receives MBMS session start request message with at least one of the restoration flag, the IP address of the old MME and an indication to indicate this network node should delete the resource allocated in the old network node for the MBMS session which has been relocated. So in this case, the MBMS-GW2 may stop the MBMS Session 1 and 2 in the MBMS-GW1.

The embodiment described in relation to the second alternative in FIG. 4 may work. The embodiment in FIG. 4 describes to let the node who initiates restoration with re-selection of control plane node to inform the old control plane node in order to delete the MBMS session have been taken over by others. In this case, the BM-SC may stop the MBMS Session 1 and 2 in the MBMS-GW1.

In the scenario exemplified in FIG. 5, when the BM-SC has detected a SGmb path failure and it receives a MBMS Session update or stop request from the content provider 115 during a transient path failure, it selects an alternative MBMS-GW to reestablish MBMS sessions prior to performing the MBMS update or stop request.

In FIGS. 2A, 2B and 2C above, the signaling sequence was described in general. A signaling sequence for restoration in an example with a SGmb path failure will now be described with reference to FIGS. 6A and 6B and with reference to FIG. 5 illustrating the communications network 100 where the failure occurs. The signaling sequence starts in FIG. 6B and continues in FIG. 6B.

FIG. 6A will now be described. MBMS Session 1 exist on BM-SC, GW1, MME/SGSN1 and MCE (eNB). FIG. 6A comprises steps 601-615 and describes a MBMS Session Restoration Phase, which steps may be performed in any suitable order than described below:

Step 601
This step corresponds to step 201a in FIG. 2A. A path failure occurs between the BM-SC and the MBMS-GW 1, i.e. a SGmb patch failure.

Step 602
The content provider 115 sends a MBMS session update request for MBMS session 1 to the BM-SC.

Step 603
This step corresponds to step 202a in FIG. 2A. The BM-SC chooses an alternative/new MBMS-GW2 and restores the MBMS Session.

Step 604
This step corresponds to step 203a in FIG. 2A. The BM-SC sends a Re-Authorize Request (RAR) to the MBMS-GW2. The RAR may be a MBMS Session start request comprising a restoration flag for MBMS Session 1.

Step 605
The MBMS-GW 2 sends a Re-Authorize Answer (RAA) back to the BM-SC. The RAA is a response to the RAR. The RAA may be a MBMS Session start response comprising an indication indicating that the MBMS Session start request in step 604 was ok.

Step 606
The MBMS-GW 2 sends a MBMS Session start request to the MME/SGSN 1. The MBMS Session start request comprises the restoration flag for MBMS Session 1 and the MBMS IP multicast distribution for GW2. Note that it is also possible that the MME/SGSN 2 is selected instead of the MME/SGSN 1 in this step. However, selection of MME/SGSN 1 is used as an example.

Step 607
The MME/SGSN 1 updates the MBMS Session's GTP-C path from the MME/SGSN1-GW1 to the MME/SGSN1-GW2.

Step 608
The MME/SGSN 1 sends a MBMS Session start response to the MBMS-GW2. The MBMS Session start response comprises an indication indicating that the MBMS Session start request in step 606 was ok.

Step 609
The MME/SGSN 1 checks the "MBMS IP Multicast Distribution" updated from the MBMS-GW1 to the MBMS-GW2, and triggers an M3 interaction to convey this to the downstream nodes.

Step 610
This step corresponds to step 204a in FIG. 2A. The MME/SGSN1 sends a MBMS Session Start Request to the MCE (eNB). The MBMS Session start request comprises a 'Restoration flag' for MBMS Session 1 and a GW2 'MBMS IP Multicast Distribution'.

Step 611
This step corresponds to step 205a in FIG. 2A. The MCE (eNB) reads the restoration flag from step 610 so as to accept the MBMS Session Start Request message received in step 610.

Step 612
This step corresponds to step 205a in FIG. 2A. Due to M1 information updated from the MBMS-GW1 to the MBMS-GW2, the MCE (eNB) stops the existing MBMS Session 1.

Step 613
This step corresponds to step 205a in FIG. 2A. The MME/SGSN 1 starts the MBMS Session 1 with the MBMS-GW2 M1 information.

Step 614
This step corresponds to step 206a in FIG. 2A. The MCE (eNB) sends a MBMS Session Start Response to the MME/SGSN 1. The MBMS Session start response is a response to the MBMS Session start request in step 610. The MBMS Session start response comprises an indication indicating that the MBMS Session start request was ok.

Step 615
As a result of steps 601-614, MBMS Session 1 exists on BMSC, GW2, GW1, MME/SGSN1 (may be MME/SGSN2 as well) and the MCE(eNB). Note that the MBMS Session exists on both the old and new nodes!

FIG. 6B will now be described, which is a continuation of step 6a so that steps 601-615 has already been performed when starting with the first step 616 in FIG. 6B. FIG. 6B comprises steps 616-628, which steps may be performed in any suitable order than described below:

Step 616

This step corresponds to step 208c in FIG. 2C. A MBMS Session update is performed along the new control path. Subsequent Normal Handling on the procedure required by MSG1.

For steps 617-622: If the old path is recovered, the upstream node that chooses an alternative downstream node is responsible for clearing the MBMS Sessions on the nodes along the old path Step 617

This step corresponds to step 208b in FIG. 2B and step 209c in FIG. 2C. After the MBMS Session update has been performed, the path between the BM-SC and the MBMS-GW1 is recovered.

Step 618

This step corresponds to step 209b in FIG. 2B. The BM-SC Initiates a MBMS Session Stop towards the old path for those MBMS Sessions taken over by an alternative node. The BM-SC sends a RAR to the MBMS-GW1. The RAR is a MBMS Session Stop Request for MBMS Session 1. The purpose of the MBMS Session stop request is to clear the MBMS Session along the old path.

Step 618a

This step corresponds to step 215c in FIG. 2C and is an alternative to step 618. The MBMS-GW2 sends a MBMS session stop request to the MBMS-GW1. The MBMS session stop request comprises an indication to indicate that the delete is part of restoration procedure or a new GTP message for the same purpose to delete the MBMS session. This is in order to clear the MBMS session on the nodes along the old path.

Step 619

This step corresponds to step 210b in FIG. 2B. The MBMS-GW1 sends a RAA to the BM-SC in response to the RAR in step 618. The RAA comprise a MBMS Session Stop Response and indicates that the RAR was approved.

Step 619a

This step corresponding to step 217c in FIG. 2C and is an alternative to step 619. The old MBMS-GW1 sends a session stop response or a new GTP message for the same purpose to the new MBMS-GW1 to acknowledge the receipt of the request which was received in step 618.

Steps 620-622 below relates to the example where the MME/SGSN1 was chosen in the Restoration Phase.

Step 620

The MBMS-GW1 sends a MBMS Session stop request for MBMS Session 1 to the MME/SGSN 1.

Step 621

This step corresponds to step 211b in FIG. 2B. The MME/SGSN 1 fails to match the MBMS Session due to that the GTP-C path has been updated to GW2.

Step 622

This step corresponds to step 211b in FIG. 2B. The MME/SGSN 1 sends a MBMS Session Stop Response to the MBMS-GW 1. The MBMS Session stop response is a response to the MBMS Session stop request in step 620. The MBMS Session stop response comprises an indication indicating that the MBMS Session stop request has failed.

Steps 623-627 below relates to the example where the MME/SGSN2 was chosen in Restoration Phase.

Step 623

This step corresponds to step 211b in FIG. 2B. The MBMS-GW 1 sends a MBMS Session Stop Request for MBMS session 1 to the MME/SGSN 2.

Step 624

This step corresponds to step 211b in FIG. 2B. The MME/SGSN 2 sends a MBMS Session Stop Response to the MBMS-GW 1. The MBMS Session stop response comprises an indication indicating that the MBMS Session stop request in step 623 was ok. The MBMS Session stop response is a response to the MBMS Session stop request.

Step 625

This step corresponds to step 211b in FIG. 2B. The MME/SGSN 2 sends the MBMS Session stop request for MBMS Session 1 to the MCE (eNB).

Step 626

This step corresponds to step 211b in FIG. 2B. The MCE (eNB) fails to match the MBMS Session due to that the M3AP path was updated to the MME/SGSN 2.

Step 627

This step corresponds to step 211b in FIG. 2B. The MCE (eNB) sends a MBMS Session stop response to the MME/SGSN 1. The MBMS Session stop response is a response to the request in step 625. The MBMS Session stop response comprises an indication indicating the failure in step 626.

Step 628

As a result of the steps above, MBMS Session 1 exists only on BMSC, GW2, MME/SGSNx (where x equals 1 or 2) and MCE (eNB). MBMS Session 1 thereby only exists along the new path.

In FIGS. 2a, 2b and 2c above, the signaling sequence was described in general. A signaling sequence for restoration in an example with a Sn/Sm path failure will now be described with reference to FIG. 7 and with reference to FIG. 4 illustrating the communications network 100 where the failure occurs. Session 1exist on BM-SC, GW, MME1 and MCE (eNB) at start of the method. The method comprises the following steps, which steps may be performed in any suitable order than described below:

Step 701

A path failure occurs.

Step 702

The content provider sends a MBMS session update request for MBMS session 1 to the BM-SC.

Step 703

The BM-SC sends a RAR to the MBMS-GW1. The RAR may be a MBMS session start request comprising a restoration flag for MBMS session 1.

Step 704

The MBMS-GW1 sends a RAA to the BM-SC. The RAA may be a MBMS session start response acknowledging the request received in step 703.

Step 705

The MBMS-GW1 chooses an alternative MME to restore the MBMS session 1.

Step 706

The MBMS-GW1 sends a MBMS session start request comprising a restoration flag for MBMS session 1 for to the MME/SGSN2.

Step 707

The MME/SGSN2 handles the MBMS session start request.

Step 708

The MME/SGSN2 sends a MBMS session start response to the MBMS-GW1 acknowledging the received request in step 706.

Step 709

The MME/SGSN2 sends a MBMS session start request comprising the restoration for MBMS session 1 to the MCE(eNB)/RNC.

Step 710

The MCE(eNB)/RNC reads the restoration flag and thereby accepts the request message.

Step 711

The MCE(eNB)/RNC updates the M3AP path for the MBMS session 1 to MME/SGSN2.

Step 712

The MCE(eNB)/RNC sends a MBMS session start response to the MME/SGSN2 in order to acknowledge the request received in step 709.

As a result of the steps 701-712, the MBMS session 1 exists on the BM-SC, the GW, the MME/SGSN1, the MME/SGSN2 and the MCE(eNB)/RNC. The MBMS session exists on both the old and new MME/SGSN nodes.

Step 713

A MBMS session update occurs along the new control path. Subsequent normal handling on the procedure required by MSG1.

Step 714

The path between the MBMS-GW1 and the MME/SGSN1 is recovered.

Step 715

The MBMS-GW1 initiates a MBMS session stop towards the old path for those MBMS sessions taken over by the alternative/new node. The MBMS-GW1 sends a RAR to the MME/SGSN1. The RAR may be a MBMS session stop request for MBMS session 1.

Step 716

The MME/SGSN1 sends a RAA to the MBMS-GW1. The RAA may be a MBMS session stop response comprising an acknowledgement for the request received in step 715.

Step 718

The MME/SGSN1 sends a MBMS session stop request for the MBMS session 1 to the MCE(eNB)/RNC.

Step 719

The MCE(eNB)/RNC fails to match the MBMS session due to that M3AP path has been updated to MME/SGSN2.

Step 720

The MCE(eNB)/RNC sends a MBMS session stop response to the MME/SGSN1 comprising information indicating that the request in step 718 has failed.

As a result of steps 714-720, the MBMS session 1 exists on BM-SC, the GW1, the MME/SGSN2 and the MCE (eNB)/RNC. The MBMS session only exists along the new path. If the old path has been recovered, the upstream node who chooses an alternative downstream node is responsible for clearing the MBMS sessions on the nodes along the old path.

Restoration MBMS Session Along the New Nodes

During the restoration phase, i.e. steps 601-615 in FIG. 6B, an alternative MBMS-GW (MBMS-GW2 in this example) is selected. Note that the MBMS Session still exists on the old MBMS-GW (MBMS-GW1 in this example) for the second alternative described in FIG. 2B.

From the GW2 perspective, the GW2 knows that this MBMS Session setup is for restoration purpose from the restoration flag comprised in the MBMS Session start request message. The GW2 carries the restoration flag to the downstream node as well during the MBMS Session setup procedure. The GW2 may select the old downstream node (e.g. MME/SGSN1) or a new downstream node (e.g. MME/SGSN2) to restore this MBMS Session:

In the case of the old MME/SGSN (e.g. MME/SGSN1) is selected by the GW2, the MME/SGSN1 knows that this is for restoration purpose from the restoration flag. As a result, the MME/SGSN1 accepts the new MBMS Session Start Request for the existing MBMS Session 1 from the new GW (e.g. GW2). Note that without the restoration flag, it is highly likely that the MME/SGSN1 would reject the MBMS Session Start Request from a new GW as an error case.

By comparing the "MBMS IP Multicast Distribution" value in the coming message with the existing MBMS Session information, the MME/SGSN1 understands that it must update its downstream nodes e.g. MCE(eNB) with this information. So the MME/SGSN1 sends the MBMS Session Start Request message towards the MCE/eNB with both the restoration flag and the updated parameters carried.

Note: If all parameters in the coming message have the same value as those in the existing MBMS Session, the MME/SGSN1 will only respond to the GW2 with a successful MBMS Session start response message without further interacting with its downstream nodes.

In the case of a new MME/SGSN (e.g. MME/SGSN2) is selected by the GW2, the MME/SGSN2 gets a restoration flag in the MBMS Session Start Request. However, the MME/SGSN2 cannot locate the existing MBMS Session with the TMGI and Flow-ID. The MME/SGSN2 handles this MBMS Session Start Request as a new MBMS Session setup and sends a MBMS Session Start Request to the MCE/eNB but also with restoration flag set in M3 to help the MCE(eNB) differentiate the restoration procedure from others. Note that the MBMS Session still exists on the old MME/SGSN (MME/SGSN1).

Regardless of whether MBMS Session Start Request message is from the old MME/SGSN or the new MME/SGSN, the MCE (eNB) accepts message after having received the restoration flag. Because the "MBMS IP Multicast Distribution" changes, the MCE(eNB) stops the existing MBMS Session with the old "MBMS IP Multicast Distribution" and then sets-up the MBMS Session with the new "MBMS IP Multicast Distribution".

Until at this time point, the subsequent procedures originally required by the content provider 115 (e.g. MBMS Session Update or Stop) may be further processed along the new control plane path.

Stop MBMS Session on the Old Nodes

As mentioned above, the MBMS session exists on both the GW1 and the GW2, and also possible in both the MME/SGSN1 and the MME/SGSN2 (if the GW2 selects MME/SGSN2 when restoring this MBMS Session). This co-existence is problematic in some cases so the old MBMS Session may be deleted as soon as possible. Apparently the proposal by using RESET with a take-over indication is not applicable for a SGmb path failure.

As shown in FIG. 6B, for the MBMS Session removal along the old path, once the path has been recovered, the upstream node (e.g. BM-SC in this case) who initiates restoration with reselection of the control node has to inform the old node to delete the MBMS sessions have been taken over by others. The BM-SC sends a MBMS Session Stop Request towards the old MBMS-GW (GW1). The GW1 who is not aware of the MBMS Session is taken by the GW2 release its MBMS Session resource and stops the MBMS Session towards the downstream nodes, e.g. MME/SGSN1, by sending a MBMS Session Stop Request to the MME/SGSN1. There are two possibilities for MME/SGSN1's behavior upon receiving this Stop Request according to the previous restoration procedure outcome:

(1) If the restored MBMS Session is still on the MME/SGSN1, then the MME/SGSN1 has already changed the GTP-C path with the MBMS-GW from the GW1 to the GW2 during the MBMS Session restoration phase. So the MME/SGSN1 will not able to locate the MBMS Session required to be stopped by the GW1. Thus, the MME/SGSN rejects the request. The MBMS Session deletion procedure ends.

(2) If the restored MBMS Session goes on the MME/SGSN2, then the MME/SGSN1 is not aware of the MBMS Session is taken by the MME/SGSN2. As a result, the MME/SGSN1 will send back a MBMS Session Stop Response with a successful cause and then continue to stop the MBMS Session by sending the MBMS Session Stop Request to its downstream nodes e.g. MCE(eNB).

Since the M3AP path on the MCE (eNB) has changed from the MME/SGSN1 to the MME/SGSN2 during the restoration phase, the MCE (eNB) will not able to match the MBMS Session along the old M3AP path so it rejects it. The MBMS Session deletion procedure ends.

At this step, the MBMS Session on the old nodes is stopped. The MBMS Session exists normally on nodes along the new path.

The example embodiment of letting the upstream nodes to trigger MBMS Session stop procedure along old path is also valid for Sm/Sn path failure where it is the MBMS-GW who selects a new MME/SGSN may trigger the MBMS Session stop once the path failure is recovered.

Impact Analysis for MBMS Session Coexistence Risk

Figure 8:
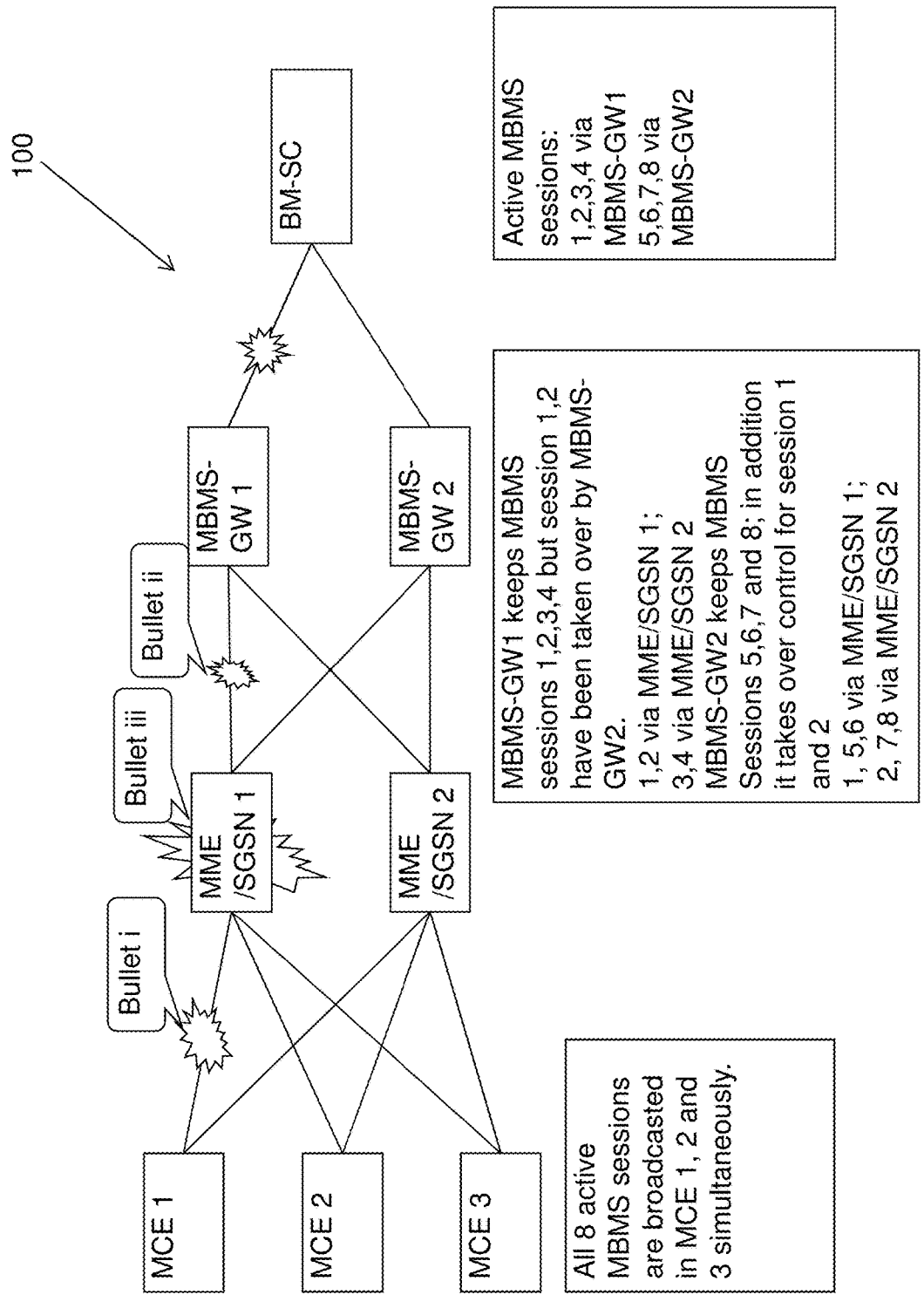
FIG. 8 is a schematic block diagram illustrating embodiments of a communications network.

Then coming back to the "risk" of the embodiments herein, i.e. both the old MBMS-GW/MME/SGSN and new MBMS-GW/MME/SGSN will have the same MBMS session between the time when the MBMS session being taken over and the time when the Sm/Sn/SGmb path is recovered, if we assume the restoration flag was introduced, the "risk" may be avoided. FIG. 8 exemplified the MBMS Session coexistence.

(i) Considering that a Sm failure has occurred between the MME/SGSN1 and the MBMS-GW 1. if a subsequent M3AP path failure or MCE restart takes place between the time when the MBMS session being taken over and the time when the Sm/Sn is recovered, the new MME/SGSN may still include the restoration flag as it remembers that the MBMS session was started with a restoration flag. The old MME/SGSN may send a MBMS session start request message without any restoration flag. With this approach, the MBMS session 1 will continue to be handled by the new MME/SGSN 2 and the MBMS session 2 will be continued to be handled by the old MME/SGSN 1.

(ii) Considering that a SGmb failure has occurred between the MBMS-GW 1 and the BM-SC and the BM-SC has selected the MBMS-GW 2 for the MBMS Session 1 and 2 upon receiving Update/Stop from the content provider 115. If a subsequent Sm path failure takes place between the MME/SGSN 1 and the MBMS-GW1 during the time when the MBMS session is being taken over and the time when the SGmb is recovered, but before the SGmb path is recovered, the MBMS-GW will not trigger any re-selection of MME/SGSN as it cannot receive any MBMS session update or stop message.

(iii) Considering that a SGmb failure has occurred between the MBMS-GW 1 and the BM-SC, and that the BM-SC has selected the MBMS-GW 2 for MBMS Session 1 and 2 upon receiving an Update message or a Stop message from the content provider 115. If a subsequent MME/SGSN1 restart takes place and the MME/SGSN1 recovers before the Max SGmb path failure timer expires, the MBMS-GW 1 will try to re-establish the MBMS Sessions 1, 2, 3 and 4. Since there is no MME/SGSN reselection procedure, the corresponding MBMS Session Start request messages will not comprise the restoration flag. At the same time, the MBMS-GW 2 will also re-establish MBMS session 1 with a restoration flag. Since the restoration flag was included by the BM-SC when re-selecting the MBMS-GW2, the MME/SGSN1 may accept the one with the restoration flag from the MBMS-GW2. For the MBMS session 2, as it is restored by the MME/SGSN2 with a restoration flag, the MCE may reject the corresponding MBMS Session start message from the MME/SGSN1 for MBMS session 2.

However, using Restoration flag need a time restraint, i.e. the restoration flag may be provided together with a guard timer, e.g. Max non-transient path failure timer in the node who initiates restoration—time elapse from the detection of path failure up to when the reselection of alternative control path, possibly plus an offset between the timers configured in the different nodes, e.g. when there is a SGmb path failure and Max non-transparent failure timer in the BM-SC is 115 s, and when BM-SC decides to select another MBMS-GW at $20^{th}$ second since the path failure is detected, the restoration flag may be included with a timer 115 s−20 s+offset (between the timer in MBMS-GW and BM-SC, 120−115)= 100 s.

So the restoration flag may be included as long as the associated timer is not expired when subsequent downstream failure takes place.

In addition, the restoration flag may be provided together with a counter. This is to solve the case when the subsequent same type of path failure takes place, for example, path failure between MBMS-GW1 and BM-SC, after $20s$, the BM-SC select alternative MBMS-GW 2 with a validation timer 100 s (115 s−20+5), however at the 40th second, the link between MBMS-GW 2 and BM-SC is failed, and at 60th second, the MME1 restarts. Between 40 s−60 s, the BM-SC may select the third alternative MBMS-GW 3? So the same MBMS session may exist in more than two control paths. When a counter is provided together with restoration flag, e.g. the BM-SC selects the third MBMS-GW3, it may increment the counter, the receiver will only handle the request message with highest counter, which is the latest.

Figure 9:
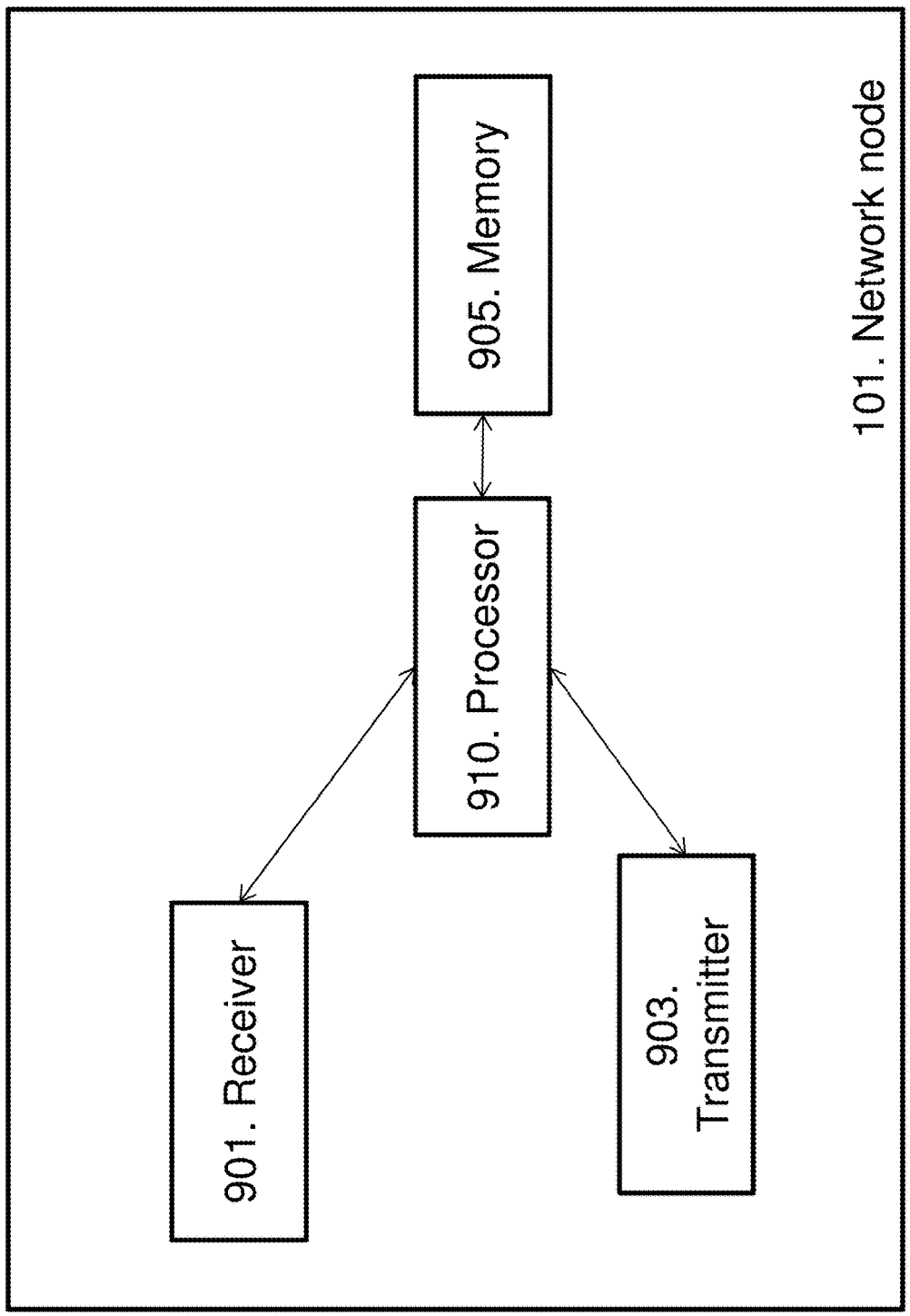
FIG. 9 is a schematic block diagram illustrating embodiments of a network node.

To perform the method steps shown in FIGS. 2 and 6 the network node 101 comprises an arrangement as shown in FIG. 9. As mentioned above, the network node 101 may be a BM-SC or a MBMS-GW. The network node 101 comprises a receiver 901 adapted to receive messages from e.g. a content provider 115 and control plane nodes 103. The network node 101 further comprises a transmitter 903 adapted to transmit messages to e.g. the content provider 115 and control plane nodes 103. The network node 101 may further comprise a memory 905 comprising one or more memory units. The memory 905 is arranged to be used to store data, received data streams, timers, messages, information related to MBMS sessions, information related to paths, threshold values, time periods, configurations, schedulings, and applications to perform the methods herein when being executed in the network node 101. Those skilled in the art will also appreciate that the receiver 901 and the transmitter 903 described above may refer to a combination of analog and digital circuits, and/or one or more processors configured with software and/or firmware, e.g. stored in the memory 905, that when executed by the one or more processors such as the processor 910 perform as described above.

Figure 10:
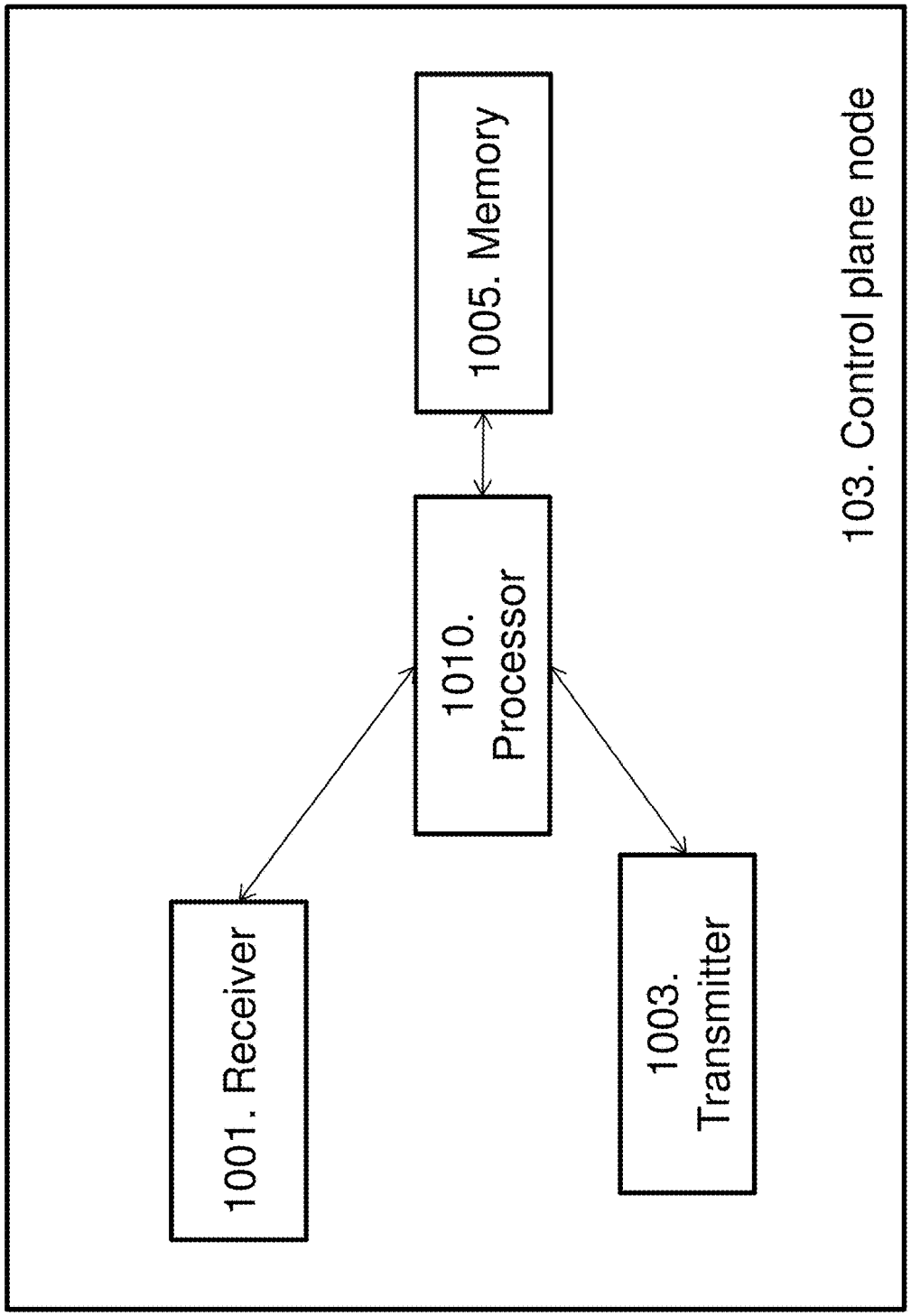
FIG. 10 is a schematic block diagram illustrating embodiments of a control plane node.

To perform the method steps shown in FIGS. 2 and 6 the control plane node 103 comprises an arrangement as shown in FIG. 10. The control plane node 103 may be an old or a new control plane node. As mentioned above, the control plane node 103 may be a MBMS-GW or a MME/SGSN. The control plane node 103 comprises a receiver 1001 adapted to receive messages from e.g. a network node and other control plane nodes. The control plane node 103 further comprises a transmitter 1003 adapted to transmit messages to e.g. the network node and other control plane nodes. The control plane node 103 may further comprise a memory 1005 comprising one or more memory units. The memory 1005 is arranged to be used to store data, received data streams, timers, messages, information related to MBMS sessions, information related to paths, threshold values, time periods, configurations, schedulings, and applications to perform the methods herein when being executed in the control plane node 103. Those skilled in the art will also appreciate that the receiver 1001 and the transmitter 1003 described above may refer to a combination of analog and digital circuits, and/or one or more processors configured with software and/or firmware, e.g. stored in the memory 1005, that when executed by the one or more processors such as the processor 1010 perform as described above.

Figure 11:
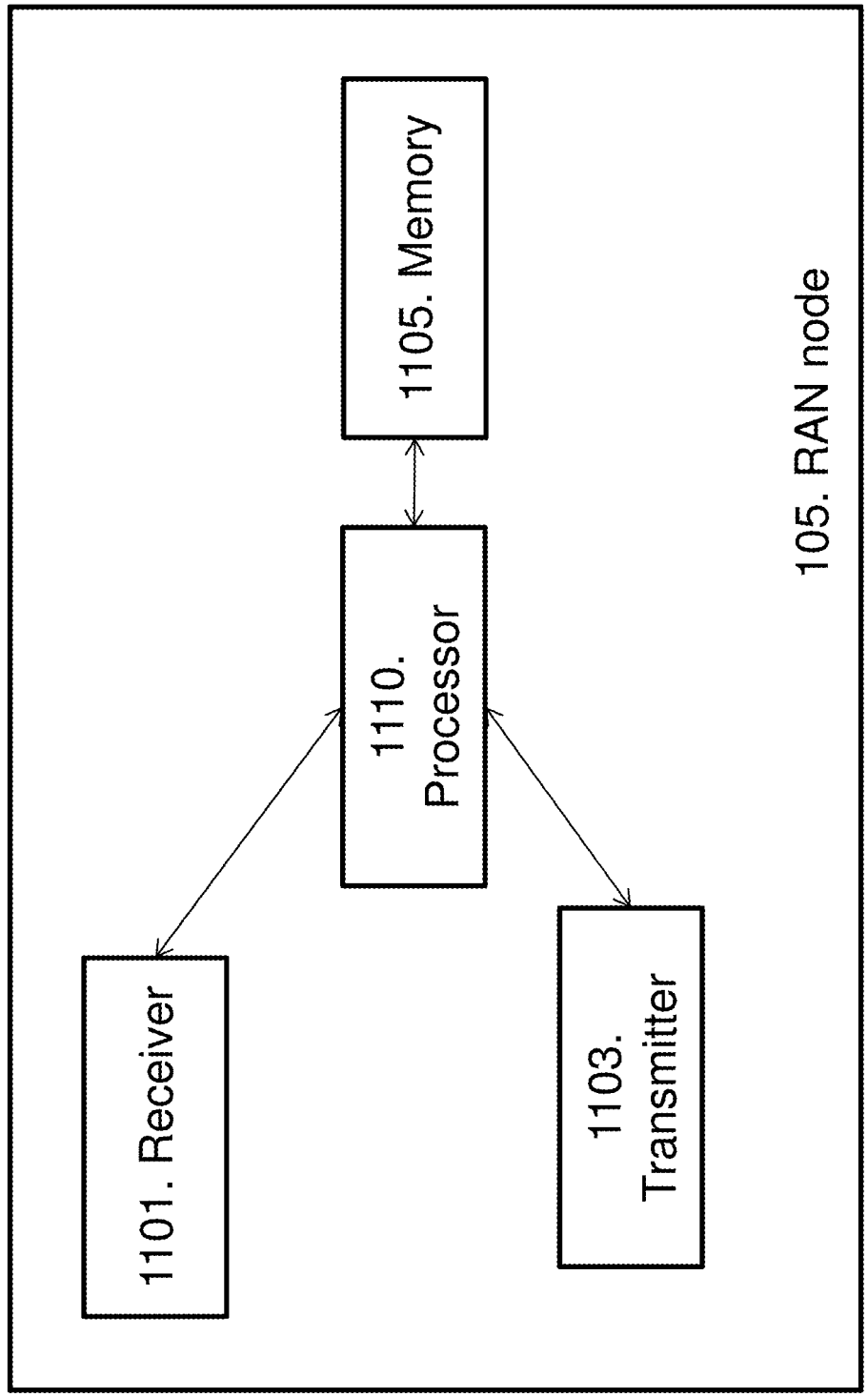
FIG. 11 is a schematic block diagram illustrating embodiments of a RAN node.

To perform the method steps shown in FIGS. 2 and 6 the RAN node 105 comprises an arrangement as shown in FIG. 11. As mentioned above, the RAN node 105 may be a base station, eNB, NB, RNC, MCE, MSC etc. The RAN node 105 comprises a receiver 1101 adapted to receive messages from e.g. the new and/or old control plane node 103b,a and other control plane nodes. The RAN node 105 further comprises a transmitter 1103 adapted to transmit messages to e.g. the new and/or old control plane node 103b,a and other control plane nodes. The RAN node 105 may further comprise a memory 1105 comprising one or more memory units. The memory 1105 is arranged to be used to store data, received data streams, timers, messages, information related to MBMS sessions, information related to paths, threshold values, time periods, configurations, schedulings, and applications to perform the methods herein when being executed in the RAN node 105. Those skilled in the art will also appreciate that the receiver 1101 and the transmitter 1103 described above may refer to a combination of analog and digital circuits, and/or one or more processors configured with software and/or firmware, e.g. stored in the memory 1105, that when executed by the one or more processors such as the processor 1110 perform as described above.

The present mechanism for handling MBMS sessions in a communications network may be implemented through one or more processors, such as a processor 910 in the network node 101 depicted in FIG. 9, a processor 1010 in the control plane node 103 depicted in FIG. 10 and a processor 1110 in the RAN node 105 depicted in FIG. 11, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the network node 101 and/or control plane node 103 and/or RAN node 105. One such carrier may be in the form of a CD ROM disc. It is however feasible with other data carriers such as a memory stick. The computer program code may furthermore be provided as pure program code on a server and downloaded to the network node 101 and/or control plane node 103 and/or RAN node 105.

Thus, in an embodiment, a computer program comprising computer program code is provided for causing the network node 101 to perform one or more embodiments previously discussed, when the computer program code is executed on the processor 910 included in the network node 101.

In a further embodiment, a computer program comprising computer program code is provided for causing the new, alternative control plane node 103b to perform one or more embodiments previously discussed, when the computer program code is executed on the processor 1010 included in the new control plane node 103b.

In still a further embodiment, a computer program comprising computer program code is provided for causing the RAN node 105 to perform one or more embodiments previously discussed, when the computer program code is executed on the processor 1110 included in the RAN node 105.

In yet a further embodiment, a computer program product comprising the previously mentioned data carrier having the computer program according to the mentioned embodiments embodied therein.

Some embodiments herein introduce a restoration flag to be set by the node who initiates restoration procedure with re-selection of downstream control node.

It is also described that it may be required for the node who initiates restoration with re-selection of downstream control node to inform the old node to stop the MBMS session which have been taken over by others after a transient path failure is recovered.

It is also described that the receiving node may use the restoration flag to decide which MBMS Session Start message may be accepted for the case that the same MBMS session is controlled by two different control plan node, e.g. MME/SGSN/MBMS-GW.

It is also described how to configure the Max path failure timer in MME/SGSN<in MBMS-GW<in BM-SC in order to re-establish the MBMS Session before bring it down. The difference between these timers may be kept as reasonable low.

It is described above how to use the restoration flag to avoid different problems.

It is also described that the node who initiates restoration with re-selection of downstream node to inform the old downstream node to stop the MBMS session which have been taken over by other node.

It is described above to introduce a restoration flag to be set by the node who initiates restoration procedure with re-selection of downstream control node, e.g. BM-SC selects an alternative MBMS-GW, together with a timer and a counter.

The timer may be set to the Max non-transient path failure timer node in the node (who initiates the restoration procedure) minus the time elapses since the path failure is detected up to the moment when the reselection of alternative control path and plus the difference between the Max non-transient path failure in the node (who initiates the restoration procedure) and next downstream node. The counter increments if there is a subsequent path failure.

The restoration flag may be included as long as the associated timer is not expired when subsequent downstream failure takes place.

It is also described to require the node who initiates restoration with re-selection of downstream control node to inform the old node to stop the MBMS session which have been taken over by others after a transient path failure is recovered.

It is also described that the receiving node may use restoration flag to decide which MBMS Session Start message may be accepted for the case that the same MBMS session is controlled by two or more different control plan nodes, e.g. MME/SGSN/MBMS-GW.

In the embodiments herein, the whole solution on restoring a MBMS Session is presented by describing the node behaviors clearly upon various combinations of the restoration flag (a new flag over SGmb (3GPP TS 29.061), Sm/Sn (to be added in 3GPP TS 29.274), M3, M2 and Iu interface (to be added in 3GPP TS 25.413)) and other parameters. More specifically, for the scenario described in FIG. 2, the behavior of MME/SGSN is addressed with "MBMS IP Multicast Distribution" updated or not in the MBMS Session Start Request message with a restoration flag.

The restoration flag may clearly tell the receiver (e.g. MME/SGSN) this is a restoration procedure for the very same MBMS service identified by TMGI and Flow-ID.

If the same downstream node, i.e., MME/SGSN1, is selected during the restoration procedure, by comparing the "MBMS IP Multicast Distribution" with the existing MBMS Session information, MME/SGSN1 may get to know the Control information for the M1 interface changes or not. If it changes, then MME/SGSN must convey this updated information to eNBs. If it does not change, the M3 interaction is not needed if all other parameters are the same.

If a different downstream node, i.e., MME/SGSN2, is selected, then both old node and new node will have the same MBMS session, the embodiments herein propose to stop the resource on the old control path by the upstream node (e.g. BM-SC who selects a new MBMS-GW in case of SGmb path failure, or MBMS-GW who selects a new MME/SGSN in case of Sm path failure) after the old path is recovered.

The embodiments herein describe MBMS Session restoration towards an alternative downstream node procedure for the case of SGmb path transient failure. The embodiments herein also describe a MBMS Session stop procedure towards the old downstream node for case of SGmb/Sm/Sn path transient failure.

The control path may be re-established to allow subsequent MBMS session update and stop; in addition, such re-establishing may be performed before bring down the MBMS sessions.

The embodiments herein are not limited to the above described embodiments. Various alternatives, modifications and equivalents may be used. Therefore, the above embodiments should not be taken as limiting the scope of the embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The term "configured to" used herein may also be referred to as "arranged to" or "adapted to".

It should also be emphasised that the steps of the methods defined in the appended claims may, without departing from the embodiments herein, be performed in another order than the order in which they appear.

Some embodiments described herein may be summarized as follows.

One embodiment relates to a method in a network node for restoring an MBMS session after path failure, comprising: detecting a path failure associated with an old path between the network node and an old control plane node, which old control plane node controls at least one MBMS session; selecting the new, alternative control plane node to re-establish the at least one MBMS session; detecting that the old path between the network node and the old control plane node has been recovered; and sending to the old control plane node an MBMS session stop request in order to clear the MBMS session on the nodes along the old path involving the old control plane node.

The method may further comprise detecting that the path failure is a transient path failure.

The method may further comprise performing the selecting before a path failure timer has expired.

Further, in the method, the path failure may be regarded as transient when the selection takes place before the path failure timer has expired.

The method may further comprise: sending an MBMS session start request to the new control plane node; and receiving an MBMS session start response from the new control plane node acknowledging the receipt of the MBMS session start request.

Further, in the method, the MBMS session start request may comprise a re-establishment flag enabling the new control plane node to differentiate the restoration procedure from other procedures.

Further, in the method, the MBMS session start request may comprise a re-establishment flag enabling the new control plane node to differentiate whether it is an error so it may reject the MBMS session start request, or whether it is a restoration procedure so it may accept the MBMS session start request.

Further, in the method, the MBMS session start request may comprise a counter enabling handling of a latest MBMS session start request in case a subsequent same type of path failure takes place.

The method may further comprise: receiving an MBMS session stop response from the old control plane node.

Another embodiment relates to a method in a new, alternative control plane node for restoring an MBMS session after path failure, comprising: receiving an MBMS session start request from the network node; sending an MBMS session start request to the RAN node, possibly in the form of or comprising an MCE; receiving an MBMS session start response from the RAN node; and sending an MBMS session start response to the network node acknowledging the receipt of the MBMS session start request.

Further, in the method, the MBMS session start request sent to the RAN node may comprise a re-establishment flag enabling the RAN node to differentiate the restoration procedure from other procedures.

Further, in the method, the MBMS session start request sent to the RAN node may comprise a re-establishment flag enabling the RAN node to know that it may accept the MBMS session start request.

Further, in the method, the MBMS session start request sent to the RAN node may comprise a re-establishment flag enabling the RAN node to differentiate whether it is an error so it may reject the MBMS session start request or whether it is a restoration procedure so it may accept the MBMS session start request.

Further, in the method, the MBMS session start request may comprise a counter enabling handling of a latest MBMS session start request in case a subsequent same type of path failure takes place.

Another embodiment relates to a method in a RAN node, possibly in the form of or comprising an MCE, for restoring an MBMS session after path failure where the MBMS session already exists on the RAN node, the method comprising: receiving an MBMS session start request comprising a re-establishment flag for the MBMS session from the new control plane node; and re-establishing the MBMS session with the new control plane node.

The method may further comprise: sending a session start response to the new control plane node 103*b* acknowledging the receipt of the MBMS session start request.

Further, in the method, the re-establishing may comprise: stopping the existing MBMS session; and starting the MBMS session with the new control plane node.

Further, in the method, the RAN node may use the re-establishment flag to differentiate the restoration procedure from other procedures.

Further, in the method, the RAN node may use the re-establishment flag to know that it may accept the MBMS session start request.

Further, in the method, the RAN node may use the re-establishment flag to differentiate whether it is an error so it may reject the MBMS session start request or whether it is a restoration procedure so it may accept the MBMS session start request.

Further, in the method, the MBMS session start request may comprise a counter enabling handling of a latest MBMS session start request in case a subsequent same type of path failure takes place.

Another embodiment relates to a network node being configured to restore an MBMS session after path failure, comprising a processor and a memory. The memory contains software that when executed by the processor causes the network node to be operative to: detect a path failure associated with an old path between the network node and the old control plane node, which old control plane node controls at least one MBMS session; select a new, alternative control plane node to re-establish the at least one MBMS session; detect that the old path between the network node and the old control plane node has been recovered; and send to the old control plane node an MBMS session stop request in order to clear the MBMS session on the nodes along the old path involving the old control plane node.

The network node may further be operative to detect that the path failure is a transient path failure.

The network node may further be operative to select the alternative control plane node 103*b* before a path failure timer has expired.

The network node may further be operative to regard the path failure as transient when the selection takes place before the path failure timer has expired.

The network node may further be operative to: send an MBMS session start request to the new control plane node; and receive an MBMS session start response from the alternative control plane node acknowledging the receipt of the MBMS session start request.

The network node may further be operative to send the MBMS session start request comprising a re-establishment flag enabling the alternative control plane node to differentiate the restoration procedure from other procedures.

The network node may further be operative to send the MBMS session start request comprising a re-establishment flag enabling the alternative control plane node to differentiate whether it is an error so it may reject the MBMS session start request, or whether it is a restoration procedure so it may accept the MBMS session start request.

The network node may further be operative to send the MBMS session start request comprising a counter enabling handling of a latest MBMS session start request in case a subsequent same type of path failure takes place.

The network node may further be operative to receive an MBMS session stop response from the old control plane node.

The network node may be one of a BM-SC and a MBMS-GW.

Another embodiment is directed to a new alternative control plane node configured to restore a MBMS session after path failure. The control plane node comprises a processor and a memory, said memory containing software that when executed by said processor, the control plane node is operative to: receive an MBMS session start request from a network node; send an MBMS session start request to a MCE; receive an MBMS session start response from the MCE; and send an MBMS session start response to the network node acknowledging the receipt of the MBMS session start request.

The control plane node may be further operative to send the MBMS session start request to the MCE comprising a re-establishment flag enabling the MCE to differentiate the restoration procedure from other procedures.

The control plane node may be further operative to send the MBMS session start request to the MCE comprising a re-establishment flag enabling the MCE to know that it may accept the MBMS session start request.

The control plane node may be further operative to send the MBMS session start request to the MCE comprising a re-establishment flag enabling the MCE to differentiate whether it is an error so it may reject the MBMS session start request or whether it is a restoration procedure so it may accept the MBMS session start request.

The control plane node may be further operative to send the MBMS session start request comprising a counter enabling handling of a latest MBMS session start request in case a subsequent same type of path failure takes place.

The control plane node (103*b*) according to any one of claims 32-36, said network node being one of: a Mobility Management Entity, MME, a Serving General Packet Radio Service, GPRS, Support Node, SGSN, and a Multimedia Broadcast Multicast Service Gateway, MBMS-GW.

Still another embodiment relates to the RAN node, possibly in the form of or comprised by an MCE, being configured to restore an MBMS session after path failure where the MBMS session already exists on the RAN node, comprising a processor and a memory. The memory contains software that when executed by the processor causes the RAN node to be operative to: receive an MBMS session start request comprising a re-establishment flag for the MBMS session from the new control plane node; and re-establish the MBMS session with the alternative control plane node.

The RAN node may further be operative to: send a session start response to the new control plane node acknowledging the receipt of the MBMS session start request.

The RAN node may further be operative to: stop the existing MBMS session; and start the MBMS session with the new control plane node 103*b*.

The RAN node may further be operative to use the re-establishment flag to differentiate the restoration procedure from other procedures.

The RAN node may further be operative to use the re-establishment flag to know that it may accept the MBMS session start request.

The RAN node may further be operative to use the re-establishment flag to differentiate whether it is an error so it may reject the MBMS session start request or whether it is a restoration procedure so it may accept the MBMS session start request.

The RAN node may be one of an RBS an eNB, a NodeB, a B node, an RNC, a BSC, and a BTS.

The invention claimed is:

1. A method for restoring a Multimedia Broadcast Multicast Service (MBMS) session after a path failure, comprising:
a Mobility Management Entity (MME) receiving a first MBMS session start request transmitted by a MBMS gateway (GW), the first MBMS session start request comprising a re-establishment flag that signals that the first MBMS session start request is used to re-establish an MBMS session;
after receiving the first MBMS session start request, the MME determining a base station involved in the MBMS session;
after determining the base station involved in the MBMS session, sending a second MBMS session start request to the base station, said second MBMS session start request comprising information indicating that the second MBMS session start request is used to re-establish an MBMS session;
receiving a first MBMS session start response from the base station; and
sending a second MBMS session start response to the MBMS GW acknowledging the receipt of the first MBMS session start request.

2. The method of claim 1, wherein the second MBMS session start request comprises a counter enabling handling of a latest MBMS session start request in case a subsequent same type of path failure takes place.

3. A method comprising:
a base station receiving from a mobility management entity (MME) a Multimedia Broadcast Multicast Service (MBMS} session start request, the MBMS session start request comprising a re-establishment flag;
the base station determining, based on a value of the re-establishment flag, whether or not the received MBMS session start request is for re-establishing an MBMS session; and
after determining that the received MBMS session start request is for re-establishing an MBMS session, the base station re-establishing the MBMS session with the MME.

4. The method of claim 3, comprising:
sending a session start response to the MME acknowledging the receipt of the MBMS session start request.

5. The method of claim 3, wherein the re-establishing comprises:
stopping the MBMS session; and
re-establishing the MBMS session with the MME.

6. The method of claim 3, wherein the base station uses the re-establishment flag to determine whether or not to accept the MBMS session start request.

7. The method of claim 3, wherein the base station uses the re-establishment flag to determine whether or not to accept the MBMS session start request.

8. The method of claim 3, wherein the MBMS session start request comprises a counter enabling handling of a latest MBMS session start request in case a subsequent same type of path failure takes place.

9. A Mobility Management Entity (MME), the MME comprising:
a receiver for receiving a first MBMS session start request transmitted by a MBMS gateway (GW), the first MBMS session start request comprising a re-establishment flag that signals that the first MBMS session start request is used to re-establish an MBMS session;
a transmitter; and
processing circuitry for:
determining a base station involved in the MBMS session; and
employing the transmitter to send a second MBMS session start request to the base station, said second MBMS session start request comprising information indicating that the second MBMS session start request is used to re-establish an MBMS session.

10. The MME of claim 9, wherein the second MBMS session start request comprises a counter enabling handling of a latest MBMS session start request in case a subsequent same type of path failure takes place.

11. The MME of claim 9, said network node being one of: a Mobility Management Entity, MME, a Serving General Packet Radio Service, GPRS, Support Node, SGSN, and a Multimedia Broadcast Multicast Service Gateway, MBMS-GW.

12. base station, the base station comprising:
a receiver for receiving from a mobility management entity (MME) a Multimedia Broadcast Multicast Service (MBMS) session start request, the MBMS session start request comprising a re-establishment flag; and
processing circuitry for:
determining, based on a value of the re-establishment flag, whether or not the received MBMS session start request is for re-establishing an MBMS session; and
after determining that the received MBMS session start request is for re-establishing an MBMS session, re-establishing the MBMS session with the MME.

13. he base station of claim 12, further being operative to:
send a session start response to the MME acknowledging the receipt of the MBMS session start request.

14. he base station of claim 12, further being operative to:
stop the MBMS session; and
re-establish the MBMS session with the MME.

15. The base station of claim 12, wherein the base station is operative to use the re-establishment flag to differentiate the restoration procedure from non-restoration procedures.

16. The base station of claim 12, wherein the base station is operative to use the re-establishment flag to determine whether or not to accept the MBMS session start request.

17. The base station of claim 12, wherein the base station is operative to use the re-establishment flag to determine whether or not to reject the MBMS session start request.

18. The base station of claim 12, wherein the MBMS session start request comprises a counter enabling handling of a latest MBMS session start request in case a subsequent same type of path failure takes place.

* * * * *

UNITED STATES PATENT AND TRADEMARK OFFICE
CERTIFICATE OF CORRECTION

PATENT NO. : 11,595,246 B2
APPLICATION NO. : 16/221149
DATED : February 28, 2023
INVENTOR(S) : Xia et al.

It is certified that error appears in the above-identified patent and that said Letters Patent is hereby corrected as shown below:

On the Title Page

On Page 2, Item (56), under "OTHER PUBLICATIONS", in Column 1, Line 12, delete "Broadcast/Multicast" and insert -- Broadcast Multicast --, therefor.

In the Drawings

In Fig. 2C, Sheet 4 of 14, delete "213c. MBMS" and insert -- 214c. MBMS --, therefor.

In Fig. 6A, Sheet 8 of 14, in Step "611", Line 2, delete "so accept" and insert -- so as to accept --, therefor.

In Fig. 7, Sheet 10 of 14, in Step "710", in Line 1, delete "flag so" and insert -- flag to --, therefor.

In the Specification

In Column 1, Line 8, delete "2015" and insert -- 2015, now Pat. No. 10,193,743, --, therefor.

In Column 15, Line 55, delete first occurrence "FIG. 6B" and insert -- FIG. 6A --, therefor.

In Column 19, Lines 55-56, delete "FIG. 6B," and insert -- FIG. 6A, --, therefor.

In the Claims

In Column 29, Line 59, in Claim 7, delete "accept" and insert -- reject --, therefor.

In Column 30, Line 29, in Claim 12, delete "base station," and insert -- A base station, --, therefor.

Signed and Sealed this
Seventeenth Day of October, 2023

*Katherine Kelly Vidal*
*Director of the United States Patent and Trademark Office*

In Column 30, Line 42, in Claim 13, delete "he base" and insert -- The base --, therefor.

In Column 30, Line 45, in Claim 14, delete "he base" and insert -- The base --, therefor.